(12) United States Patent
Hashimoto et al.

(10) Patent No.: US 7,930,511 B2
(45) Date of Patent: *Apr. 19, 2011

(54) METHOD AND APPARATUS FOR MANAGEMENT BETWEEN VIRTUALIZED MACHINES AND VIRTUALIZED STORAGE SYSTEMS

(75) Inventors: Akiyoshi Hashimoto, Kawasaki (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/831,076

(22) Filed: Jul. 6, 2010

(65) Prior Publication Data

US 2010/0275058 A1   Oct. 28, 2010

Related U.S. Application Data

(63) Continuation of application No. 12/120,058, filed on May 13, 2008, now Pat. No. 7,783,856, which is a continuation of application No. 11/133,821, filed on May 20, 2005, now abandoned.

(30) Foreign Application Priority Data

Jan. 28, 2005   (JP) .................................. 2005-020908

(51) Int. Cl.
 *G06F 13/00* (2006.01)
 *G06F 13/28* (2006.01)
(52) U.S. Cl. ...................................................... 711/173
(58) Field of Classification Search .................. 719/324; 711/173
 See application file for complete search history.

(56) References Cited

U.S. PATENT DOCUMENTS 5,996,026 A   11/1999   Onodera et al.
(Continued)

FOREIGN PATENT DOCUMENTS

EP   1357476 A   10/2003
(Continued)

OTHER PUBLICATIONS

Iwayama "Release of SAP, a newest version 'XI 3.0' of Cooperation between Systems," Computopia Dec. 2004, 39:89-93, Computer Age CO, Ltd. (Nov. 24, 2004).

(Continued)

*Primary Examiner* — Kevin L Ellis
*Assistant Examiner* — Gary W Cygiel
(74) *Attorney, Agent, or Firm* — Kilpatrick Townsend & Stockton LLP

(57) ABSTRACT

To manage physical paths between a server system and a storage system and information about routing between virtual machines and virtual storage systems in an integrated fashion. A computer system of the present invention includes: a computer and a storage system that stores data, in which the computer includes first information for managing the first resource relating to the computer; and the storage system includes second information for managing the second resource provided in the storage system, and in which a relation between the virtual machine and the virtual storage system is defined based on the first information and the second information.

12 Claims, 31 Drawing Sheets

U.S. PATENT DOCUMENTS

| | | |
|---|---|---|
| 6,820,168 B2 | 11/2004 | Tanaka et al. |
| 7,093,035 B2 | 8/2006 | Hashimoto |
| 7,107,273 B2 | 9/2006 | Ohata et al. |
| 7,117,499 B2 | 10/2006 | Kawamoto et al. |
| 7,209,452 B2 | 4/2007 | Taylor et al. |
| 7,412,504 B2 | 8/2008 | Hirata et al. |
| 7,783,779 B1 * | 8/2010 | Scales et al. ............ 709/240 |
| 2002/0069335 A1 | 6/2002 | Flylnn |
| 2002/0124040 A1 | 9/2002 | Foster et al. |
| 2002/0156887 A1 | 10/2002 | Hashimoto |
| 2003/0055933 A1 | 3/2003 | Ishizaki et al. |

FOREIGN PATENT DOCUMENTS

| | | |
|---|---|---|
| GB | 2410816 A | 8/2005 |
| JP | 09-274598 A | 10/1997 |
| JP | 2002-222110 A | 8/2002 |
| JP | 2003-157177 A | 5/2003 |

OTHER PUBLICATIONS

Warrick et al., "The IBM Total Storage DS8000 Series: Concepts and Architecture," SG-24-6452-00 (Jan. 2005).

* cited by examiner

| I/O ADAPTOR NUMBER 111 | VIRTUAL I/O ADAPTOR NUMBER 112 | VIRTUAL MACHINE NUMBER 113 |
|---|---|---|
| 0 | 0 | 0 |
| 1 | 1 | 0 |
| 0 | 2 | 1 |
| 1 | 3 | 1 |

VIRTUAL I/O ADAPTOR CONTROL TABLE OF SERVER SYSTEM (0)  110

*FIG.3A*

| I/O ADAPTOR NUMBER 161 | VIRTUAL I/O ADAPTOR NUMBER 162 | VIRTUAL MACHINE NUMBER 163 |
|---|---|---|
| 2 | 4 | 2 |
| 3 | 5 | 2 |
| 2 | 6 | 3 |
| 3 | 3 | 3 |

VIRTUAL I/O ADAPTOR CONTROL TABLE OF SERVER SYSTEM (1)  160

*FIG.3B*

| VIRTUAL STORAGE SYSTEM NUMBER | VIRTUAL CHANNEL ADAPTOR NUMBER | CHANNEL ADAPTOR NUMBER |
|---|---|---|
| 0 | 0 | 0 |
| 0 | 1 | 1 |
| 1 | 2 | 0 |
| 1 | 3 | 1 |
| 0 | 0 | 2 |
| 0 | 1 | 3 |
| 1 | 2 | 2 |
| 1 | 3 | 3 |

VIRTUAL CHANNEL ADAPTOR CONTROL TABLE

FIG.4

VIRTUAL PATH CONTROL TABLE

| VIRTUAL STORAGE SYSTEM NUMBER | VIRTUAL CHANNEL ADAPTOR NUMBER | CHANNEL ADAPTOR NUMBER | I/O ADAPTOR NUMBER | VIRTUAL I/O ADAPTOR NUMBER | VIRTUAL MACHINE NUMBER |
|---|---|---|---|---|---|
| 0 | 0 | 0 | 0 | 0 | 0 |
| 0 | 1 | 1 | 1 | 1 | 0 |
| 1 | 2 | 0 | 0 | 2 | 1 |
| 1 | 3 | 1 | 1 | 3 | 1 |
| 0 | 0 | 2 | 2 | 4 | 2 |
| 0 | 1 | 3 | 3 | 5 | 2 |
| 1 | 2 | 2 | 2 | 6 | 3 |
| 1 | 3 | 3 | 3 | 7 | 3 |

FIG. 5

| VIRTUAL MACHINE NUMBER | CPU ALLOCATION | MEMORY CAPACITY | I/O ADAPTOR NUMBER |
|---|---|---|---|
| 0 | 20% | 512MB | 0<br>1 |
| 1 | 30% | 128MB | 0<br>1 |
| ⋮ | ⋮ | ⋮ | ⋮ |

SERVER RESOURCES CONTROL TABLE   115

FIG.6

| VIRTUAL MACHINE NUMBER (601) | VIRTUAL DISK NUMBER (602) | DISK CACHE CAPACITY (603) | CPU NUMBER (604) | CHANNEL ADAPTOR NUMBER (605) |
|---|---|---|---|---|
| 0 | 121 | 512MB | 2 | 0 |
|   | 122 |       | 3 | 1 |
| 1 | 16  | 256MB | 2 | 2 |
|   | 17  |       | 3 | 3 |
| ⋮ | ⋮ | ⋮ | ⋮ | ⋮ |

STORAGE RESOURCES CONTROL TABLE — 265

VIRTUAL PATH CONTROL TABLE

| VIRTUAL STORAGE SYSTEM NUMBER 311 | VIRTUAL CHANNEL ADAPTOR NUMBER 312 | CHANNEL ADAPTOR NUMBER 313 | I/O CHANNEL PORT NUMBER (STORAGE SIDE) 318 | I/O CHANNEL PORT NUMBER (SERVER SIDE) 319 | I/O ADAPTOR NUMBER 314 | VIRTUAL I/O ADAPTOR NUMBER 315 | VIRTUAL MACHINE NUMBER 316 |
|---|---|---|---|---|---|---|---|
| 0 | 0 | 0 | 1 | 5 | 0 | 0 | 0 |
| 0 | 1 | 1 | 2 | 6 | 1 | 1 | 0 |
| 1 | 2 | 0 | 1 | 5 | 0 | 2 | 1 |
| 1 | 3 | 1 | 2 | 6 | 1 | 3 | 1 |
| 0 | 0 | 2 | 3 | 7 | 2 | 4 | 2 |
| 0 | 1 | 3 | 4 | 8 | 3 | 5 | 2 |
| 1 | 2 | 2 | 3 | 7 | 2 | 6 | 3 |
| 1 | 3 | 3 | 4 | 8 | 3 | 7 | 3 |

317

|  | OUTPUT PORT NUMBER | | | |
|---|---|---|---|---|
|  | 0 | 1 | ... | n |
| 0 |  | ○ |  | × |
| 1 | ○ |  |  | ○ |
| ⋮ |  |  |  |  |
| n-1 | × | × |  | × |
| n | × | ○ |  |  |

INPUT PORT NUMBER (1301)

ZONE CONFIGURATION TABLE (1300), (1302)

FIG.30

METHOD AND APPARATUS FOR MANAGEMENT BETWEEN VIRTUALIZED MACHINES AND VIRTUALIZED STORAGE SYSTEMS

CROSS-REFERENCES TO RELATED APPLICATIONS

The application is a continuation application of U.S. patent application Ser. No. 12/120,058, filed on May 13, 2008, which claims priority from U.S. patent application Ser. No. 11/133,821, filed on May 20, 2005, which in turn claims priority to Japanese Patent Application P2005-20908, filed on Jan. 28, 2005, the contents of all of which are incorporated in their entirety for all purposes.

BACKGROUND OF THE INVENTION

This invention relates to a computer system, and more particularly to a technique of logically partitioning a computer system including a storage system.

One approach to improving the performance of an information processing system is to increase the number of computers in an information processing system. However, the use of many computers in a system poses the following problem: it necessitates a troublesome task of controlling individual computers, requires a larger footprint for the computers and consumes more electric power.

As a solution to this problem, technology which logically partitions resources of a computer with a large processing capacity (LPAR: Logical Partitioning) and makes it possible to use resulting logical partitions as independent virtual machines has been proposed. This logical partitioning technology can make one computer look like a plurality of virtual machines. When allocation of resources (processor, memory, etc.) to partitions is controlled, the performance of each virtual machine is assured.

With this technology, different operating systems can be freely installed in virtual machines and each virtual machine can be turned on and off independently. Also faults in a virtual machine can not propagate to other virtual machines and the failed virtual machine can recover from the faults independently. Thus the computer with logical partitioning technology has greater flexibility than that of computer which does not have the technology.

In addition, the user can consolidate physical machines into fewer physical machines. As a consequence the user benefits from the logical partitioning technology in terms of system management, footprint, and power consumption. This kind of logical partitioning technology is disclosed, for example, in JP 2003-157177 A.

Also, US 2003-0055933 discloses a technique of accessing a storage system from a logically partitioned virtual machine.

Also, a storage system logically partitioned by applying a technique of logically partitioning computers is proposed in IBM, "The IBM TotalStorage DS8000 Series: Concepts and Architecture", [online], Internet <URL: http://www.redbooks.ibm.com/redpieces/pdfs/ sg246452.pdf>.

BRIEF SUMMARY OF THE INVENTION

A technique for preventing system down to improve computer system reliability is also proposed. For this purpose, techniques like clustering, multiplexing, automatic backup, hot swapping, etc. are used to realize high-availability computer systems.

With conventional techniques of logically partitioning computers, resources in a computer, such as processors and memory, are logically partitioned and allocated to individual virtual machines. Similarly, conventional techniques of logically partitioning storage systems logically partition resources in a storage system, such as cache memory and disk drives, and allocate the partitioned resources to individual virtual storage systems.

However, with these conventional techniques, the virtualization engine on the server side and the virtualization engine on the storage side do not cooperate with each other.

Furthermore, virtual paths established between virtual machines and virtual storage systems do not always correspond to physical paths. This requires that the administrator constantly check the relations between the virtual paths and physical paths in making settings of the server and storage systems. In particular, with computer systems having high availability, server and storage systems are so complicatedly related that making settings of the server and storage systems while checking their relations requires advanced skills.

In other words, with conventional techniques, no information about routing between virtual machines and virtual storage systems exists, because the server-side virtualization engine and the storage-side virtualization engine do not cooperate with each other. This raises a problem in that realizing high availability requires referring to configuration information on both of the server side and the storage side.

It is therefore an object of this invention to manage physical paths between a server system and a storage system and information about routing between virtual machines and virtual storage systems in an integrated fashion.

According to an embodiment of this invention, there is provided a computer system including a computer and a storage system that stores data, the computer including a first control unit that logically partitions a first resource provided in the computer to create and run an independent virtual machine; and first information for managing the first resource, and the storage system including a second control unit that logically partitions a second resource provided in the storage system to create and run an independent virtual storage system; and second information for managing the second resource provided in the storage system, in which a relation between the virtual machine and the virtual storage system is defined based on the first information and the second information.

According to the embodiment of this invention, it is possible to easily realize a high-availability configuration of a computer system including virtual machines and virtual storage systems.

BRIEF DESCRIPTION OF THE DRAWINGS

The present invention can be appreciated by the description which follows in conjunction with the following figures, wherein:

FIG. 3A is a diagram illustrating a virtual I/O adaptor control table of a server system (0) according to the first embodiment;

FIG. 3B is a diagram illustrating a virtual I/O adaptor control table of a server system (1) according to the first embodiment;

FIG. 4 is a diagram illustrating a virtual channel adaptor control table according to the first embodiment;

FIG. 5 is a diagram illustrating a virtual path control table according to the first embodiment;

FIG. 6 is a diagram illustrating a server resources control table according to embodiments of this invention;

FIG. 7 is a diagram illustrating a storage resources control table according to embodiments of this invention;

FIG. 27 is a diagram illustrating a virtual path control table according to the sixth embodiment;

FIG. 30 is a diagram showing a configuration of a zone configuration table according to the sixth embodiment.

DETAILED DESCRIPTION OF THE INVENTION

Figure 1:
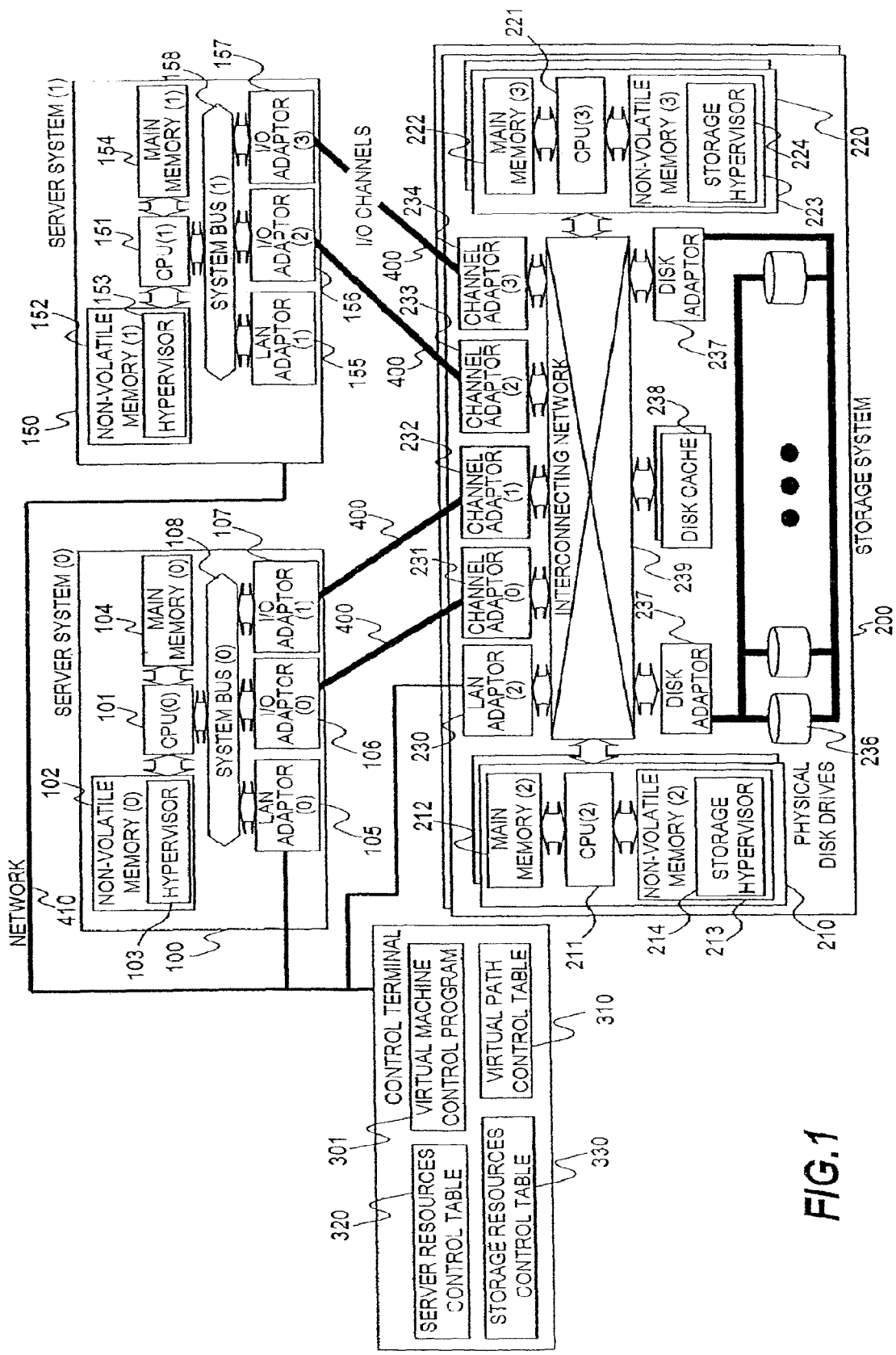
FIG. 1 is a block diagram showing a hardware configuration of a computer system according to a first embodiment of this invention.

Embodiments of this invention will be described below referring to the drawings.

First Embodiment

FIG. 1 is a block diagram showing a hardware configuration of a computer system according to a first embodiment.

The computer system of the first embodiment includes a server system (0) 100, a server system (1) 150, a storage system 200, and a control terminal 300. Application programs run in the server system (0) 100 and the server system (1) 150. The storage system 200 stores data required for operations of the server systems 100 and 150. The control terminal 300 manages information for controlling the computer system and controls operations of the entire computer system. The numbers enclosed in parentheses following the names of physical resources are identifiers of the physical resources.

The server system (0) 100 is a computer having physical resources including a CPU (0) 101, a non-volatile memory (0) 102, a main memory (0) 104, a LAN adaptor (0) 105, an I/O adaptor (0) 106, an I/O adaptor (1) 107, and a system bus 108.

The CPU (0) 101 performs arithmetic operations related to an operating system (OS) and application programs executed in the server system (0) 100.

The main memory (0) 104 stores programs and data required for the operations of the CPU (0) 101.

The system bus (0) 108 connects the CPU (0) 101 and the LAN adaptor (0) 105, the I/O adaptor 106, and the I/O adaptor 107 to transfer data and control signals.

The I/O adaptor (0) 106 and the I/O adaptor (1) 107 are connected with the storage system 200 through I/O channels (e.g., fiber channels) 400. The I/O adaptors 106 and 107 send data input/output requests and output data to the storage system 200 and receive data stored in the storage system 200. Two I/O adaptors are provided herein. More I/O adaptors may be provided. The two I/O adaptors 106 and 107 operate independently. Thus, the processing system is duplicated so that access from the server system (0) 100 to the storage system 200 will not be stopped even when one I/O adaptor fails.

The LAN adaptor (0) 105 is connected with the other server system 150, the storage system 200, and the control terminal 300, through a network 410. The LAN adaptor (0) 105 sends and receives control signals and control information (the contents of various control tables) to and from the systems connected through the network 410.

The non-volatile memory (0) 102 stores a hypervisor 103. The hypervisor 103, implemented by the execution of processing by the CPU (0) 101, is a means that enables logical partitioning of physical resources of the server system (0) 100.

The hypervisor 103 is a program which is executed by the CPU101. The hypervisor 103 is read from the non-volatile memory 102 by the initial boot program such as BIOS (Basic Input Output System) and loaded into main memory (0) 102 when the power to the server system (0) 100 is turned on. And CPU (0) 101 executes the hypervisor 103 as a program. In other words, the hypervisor 103 is a control program that creates logical partitions in the server system (0) 100 to create virtual machines that operate independently.

Instead of being loaded after the turning on of the server system (0) 100, the hypervisor 103 may be implemented by the OS of the server system (0) 100 and a virtualization engine program running on the OS. The virtualization engine program may be stored in the non-volatile memory (0) 102, or may be stored in the storage system 200. In this case, the OS is loaded when the power to the server system (0) 100 is turned on and the OS reads and executes the virtualization engine program.

The specification mostly describes operations chiefly in the software perspective, but, in reality, CPUs execute software to run the hypervisor 103 etc. and storage hypervisor 214 etc.

Alternatively, the hypervisor 103 may be configured not with software but with hardware. For example, a chip specialized for hypervisor may be provided, or a hypervisor block for controlling virtual machines may be provided in the CPU (0) 101.

The server system (1) 150 is configured the same as the server system (0) 100 described so far and so its configuration is not described here.

The storage system 200 has a storage control block 210 including a CPU (2) 211, a main memory (2) 212, and a non-volatile memory (2) 213. The storage system 200 also has a storage control block 220 including a CPU (3) 221, a main memory (3) 222, and a non-volatile memory (3) 223. The plurality of storage control blocks 210 and 220 operate independently. The processing system is thus duplicated so that the storage system 200 does not stop even when one storage control block fails.
The storage control blocks 210 and 220 control data input/output to and from physical disk drives 236 and manages operations of the storage system 200. When the storage system 200 is a NAS (Network Attached Storage), file systems operate in the storage control blocks 210 and 220.

The CPU (2) 211 performs arithmetic operations related to various control programs executed in the storage system 100.

The main memory (2) 212 stores programs and data required for the operations of the CPU (2) 211.

The non-volatile memory (2) 213 stores a storage hypervisor 214. The storage hypervisor 214, implemented by the execution of processing by the CPUs 211 and 221, is a means that enables logical partitioning of physical resources of the storage system 200.

The storage hypervisor 214 is implemented with a control program that creates logical partitions in the storage system 200 to create virtual storage systems that operate independently. The storage hypervisor 214 can be implemented by adopting various methods as described above about the hypervisor 103 of the server system (0) 100.

In the storage control block 220, the CPU (3) 221, the main memory (3) 222, the non-volatile memory (3) 223, and the storage hypervisor 224 operate in the same ways as the corresponding components of the storage control block 210.

The storage system 200 further includes a LAN adaptor (2) 230 and channel adaptors (0) 231 to (3) 234.

The channel adaptor (0) 231 and the channel adaptor (1) 232 are connected with the server system (0) 100 through the I/O channels 400. The channel adaptors 231 and 232 receive data input/output requests and out put data from the server system (0) 100 and sends data stored in the storage system 200.

Similarly, the channel adaptor (2) 233 and the channel adaptor (3) 234 are connected with the server system (1) 150 through I/O channels 400. The channel adaptors 233 and 234 receive data input/output requests and output data from the server system (1) 150 and sends data stored in the storage system 200.

The storage system 200 thus has a plurality of channel adaptors. The plurality of channel adaptors 231 to 234 operate independently. The processing system is thus duplicated so that access to the storage system 200 from the server systems 100 and 150 does not stop even when one channel adaptor fails.

The LAN adaptor (2) 230 is connected with the server systems 100 and 150 and the control terminal 300, through the network 410. The LAN adaptor (2) 230 sends and receives control signals and control information (the contents of various control tables) to and from the systems connected through the network 410.

The storage system 200 further includes disk adaptors 237, a disk cache 238, and physical disk drives 236.

The disk adaptors 237 are interfaces to the physical disk drives 236. The disk adaptors 237 send and receive data and control signals to and from the physical disk drives 236 according to a protocol such as the ATA, SAS (Serial Attached SCSI), Fibre Channel, etc.

Two disk adaptors 237 are provided herein. More disk adaptors 237 may be provided. The individual disk adaptors 237 are connected with the physical disk drives 236 through different wires. The two disk adaptors 237 operate independently. The processing system is thus duplicated so that access to the physical disk drives 236 does not stop even when one disk adaptor fails.

The disk cache 238 is a memory that temporarily stores data written to or read from the physical disk drives 236 and so the disk cache 238 improves the performance of access from the server systems 100 and 150 to the storage system 200.

The physical disk drives 236 are formed of a storage medium that stores data. The storage medium is usually formed of magnetic disks, but may be formed of other media, e.g., optical disks. The plurality of physical disk drives 236 form a RAID (Redundant Array of Independent Disks) and thus provide the stored data with redundancy. Therefore, the stored data is not lost even when some of the physical disk drives 236 fail.

The storage system 200 further includes an interconnecting network 239 that interconnects the storage control blocks 210 and 220, the LAN adaptor 230, the channel adaptors 231 to 234, the disk adaptors 237, and the disk cache 238. The interconnecting network 239 is formed of a crossbar switch, for example.

The control terminal 300 is a computer apparatus that manages the computer system and includes a CPU, memory, an input/output device, and a LAN interface in an integrated fashion. A virtual machine control program 301 runs in the CPU of the control terminal 300.

The control terminal 300 has a virtual path control table 310 shown in FIG. 5, a server resources control table 320, and a storage resources control table 330. The virtual machine control program 301 controls virtual configuration of the computer system by using the virtual path control table 310, the server resources control table 320, and the storage resources control table 330. The contents of these tables will be described later. In the first embodiment, the control terminal 300 includes a control unit (not shown) having connection information (the virtual path control table 310) that defines connection paths between virtual machines and virtual storage systems.

The LAN interface of the control terminal 300 is connected with the server system 100, the server system 150, and the storage system 200, through the network 410. The LAN interface sends and receives control signals and control information (the contents of the various control tables) to and from the systems connected through the network 410.

The I/O channels 400 are formed of a transmission medium that can make communication according to a protocol suitable for data transfer, e.g., the Fibre Channel protocol. In the first embodiment, the server systems 100 and 150 and the storage system 200 are connected in a one-to-one manner, but they may be connected through a network (SAN) as will be described later in a sixth embodiment.

The network 410 connects the server system (0) 100, the server system (1) 150, the storage system 200, and the control terminal 300.$_{13}$The network 410 is configured to communicate control signals and control information between computers according to, e.g., the TCP/IP protocol, which can be Ethernet (registered trademark).

While FIG. 1 shows an example in which two server systems 100 and 150 and one storage system 200 are connected, three or more server systems may be provided and two or more storage systems may be provided.

Figure 2:
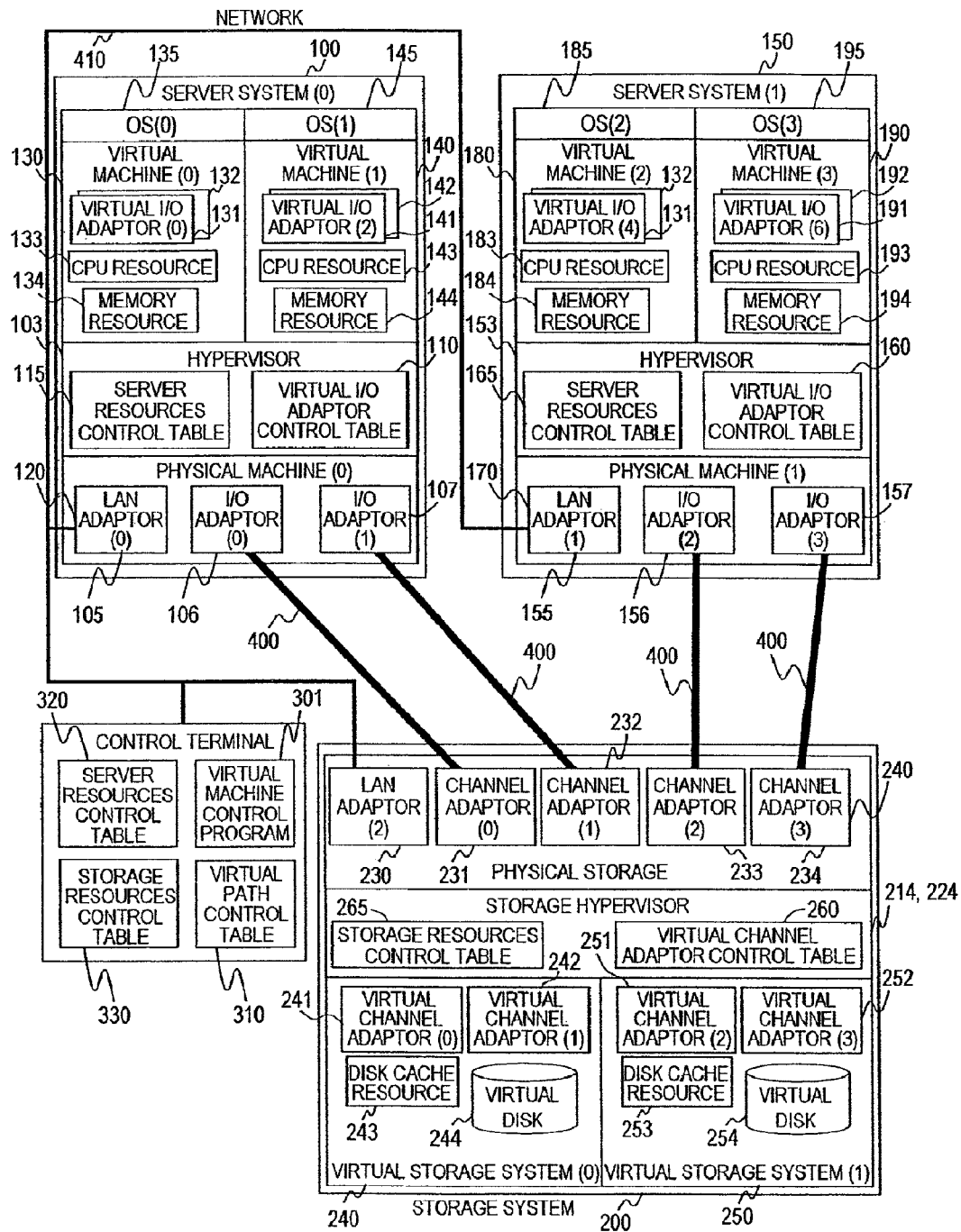
FIG. 2 is a functional block diagram of the computer system according to the first embodiment.

FIG. 2 is a functional block diagram of the computer system according to the first embodiment.

Functionally, the server system (0) 100 can be roughly divided into a physical layer, a hypervisor layer, and a virtual machine layer.

The physical layer is a physical machine (0) 120 having server resources, including the LAN adaptor and the I/O adaptors. The server resources mean the physical resources of the server system, including the CPU, memory, and I/O adaptors. While the physical machine (0) 120 includes other server resources (the CPU, memory, etc.) than those shown in FIG. 2, they are not shown in FIG. 2 because not related to the description here.

The hypervisor layer is implemented by the hypervisor 103 described earlier. The hypervisor 103 controls the server resources of the physical machine (0) 120. The hypervisor 103 has a virtual I/O adaptor control table 110 and a server resources control table 115.

The numerals enclosed in parentheses following the names of physical resources are identifiers of the physical resources. The numerals enclosed in parentheses following the names of virtual resources are identifiers of the virtual resources.

The virtual I/O adaptor control table 110 shown in FIG. 3A describes correspondences between the physical I/O adaptors and virtual I/O adaptors.

The server resources control table 115 shown in FIG. 6 defines associations between the resources of the server system (0) 100 and virtual machines. The server resources control table 115 is used to manage the server resources of the server system (0) 100.

The virtual I/O adaptor control table 110 and the server resources control table 115 are stored in the main memory 104. Alternatively, the virtual I/O adaptor control table 110 and the server resources control table 115 may be stored in the non-volatile memory 102. When these control tables 110 and 115 are stored in the non-volatile memory 102, the virtual machine control information is retained even when the power to the server system (0) 100 is shut off.

Alternatively, the virtual I/O adaptor control table 110 and the server resources control table 115 may be stored in the storage system 200, in which case the control tables 110 and 115 will be read from the storage system 200 and stored in the main memory 104 after the server system (0) 100 is booted.

Alternatively, the virtual I/O adaptor control table 110 and the server resources control table 115 may be stored in the control terminal 300, in which case the control tables 110 and 115 will be read from the control terminal 300 and stored in the main memory 104 after the server system (0) 100 is booted.

The hypervisor 103 further includes information about other server resources that configure virtual machines.

The virtual machine layer includes virtual machines 130 and 140 that the hypervisor 103 has created by logically partitioning the server resources of the physical machine (0) 120.

The virtual machine (0) 130 includes a virtual I/O adaptor (0) 131, a virtual I/O adaptor (1) 132, a CPU resource 133, and a memory resource 134. Similarly, the virtual machine (1) 140 includes a virtual I/O adaptor (2) 141, a virtual I/O adaptor (3) 142, a CPU resource 143, and a memory resource 144. The virtual machines 130 and 140 further include other server resources of the server system (0) 100, but they are not shown in FIG. 2 because not related to the description here.

An OS (0) 135 runs on the virtual machine (0) 130. Also, an OS (1) 145 runs on the virtual machine (1) 140[13] In other words, the OS (0) 135 performs arithmetic operations using the server resources allocated to the virtual machine (0) 130. Similarly, the OS (1) 145 performs arithmetic operations using the server resources allocated to the virtual machine (1) 140.

Application programs run on the OSs 135 and 145. These application programs provide database services, Web services, etc. to clients (not shown) connected to the server system (0) 100.

The server system (1) 150 has the same functions as the server system (0) 100 described above. For example, a hypervisor layer is implemented by the hypervisor 153. The hypervisor 153 has a virtual I/O adaptor control table 160 shown in FIG. 3B and a server resources control table 165 shown in FIG. 6. The details of the functions of the server system (1) 150 are therefore not described here.

The storage system 200 can be roughly divided into a physical layer, a hypervisor layer, and a virtual storage layer.

The physical layer is a physical storage 240 having storage resources, including the LAN adaptor and the channel adaptors. The storage resources mean the physical resources of the storage system, including the CPU, disk cache, channel adaptors, and physical disk drives. While the physical storage 240 includes other resources (the physical disk drives, disk cache, etc.) than those shown in FIG. 2, they are not shown in FIG. 2 because not related to the description here.

The hypervisor layer is implemented by the storage hypervisors 214 and 224 described earlier. The hypervisors 214 and 224 control the storage resources of the physical storage 240. The storage hypervisors 214 and 224 have a virtual channel adaptor control table 260 and a storage resources control table 265.

The virtual channel adaptor control table 260 shown in FIG. 4 describes correspondences between the physical channel adaptors and virtual channel adaptors.

The storage resources control table 265 shown in FIG. 7 defines associations between the resources of the storage system 200 and virtual machines. The storage resources control table 223 is used to manage the allocation of the storage resources.

The virtual channel adaptor control table 260 and the storage resources control table 265 are stored in the main memory 212. Alternatively, the virtual channel adaptor control table 260 and the storage resources control table 265 may be stored in the non-volatile memories 213 and 223. When these control tables 260 and 265 are stored in the non-volatile memories, the virtual storage system control information is retained even when the power to the storage system 200 is shut off.

Alternatively, the virtual channel adaptor control table 260 and the storage resources control table 265 may be stored in the physical disk drives 236, in which case the control tables 260 and 265 will be read from the physical disk drives 236 and stored in the main memories 212 and 222 after the storage system 200 is booted.

Alternatively, the virtual channel adaptor control table 260 and the storage resources control table 265 may be stored in the control terminal 300, in which case the control tables 260 and 265 will be read from the control terminal 300 and stored in the main memories 212 and 222 after the storage system 200 is booted.

The storage hypervisors 214 and 224 further include information about other storage resources that configure virtual storage systems.

The virtual storage layer includes virtual storage systems 240 and 250 that the hypervisors 214 and 224 have created by logically partitioning the storage resources of the physical storage 240. The virtual storage (0) 240 includes a virtual channel adaptor (0) 241, a virtual channel adaptor (1) 242, a disk cache resource 243, and a virtual disk 244. Similarly, the virtual storage (1) 250 includes a virtual channel adaptor (2) 251, a virtual channel adaptor (3) 252, a disk cache resource 253, and a virtual disk 254. The virtual storage systems 240 and 250 further include other storage resources of the storage system 200, but they are not shown in FIG. 2 because not related to the description here.

In other words, in the virtual storage system (0) 240 and the virtual storage system (1) 250, the storage hypervisors 214 and 224 may partition a physical disk drive 236 into a plurality of virtual disks 244 and 254, or may unite a plurality of physical disk drives 236 into a single virtual disk 244 or 254.

The storage system 200 selects a single virtual disk or a plurality of virtual disks from the virtual disks 244 and 254 and provides the virtual disk or disks to the virtual machines 100 and 150 as storage areas. The virtual disks thus selected are called logical units (LU). The logical unit indicates a unit that an OS can recognize as a single disk.

The control terminal 300 has the virtual path control table 310 shown in FIG. 5. The virtual path control table 310 describes relations between the virtual machines and the virtual storage systems. The control terminal 300 generates the virtual path control. table 310 by collecting together the control information contained in the virtual I/O adaptor control table 110 of the server system (0) 100, the control information contained in the virtual I/O adaptor control table 160 of the server system (1) 150, and the control information contained in the virtual channel adaptor control table 260 of the storage system 200.

FIGS. 3A and 3B are diagrams illustrating the virtual I/O adaptor control tables according to the first embodiment. As stated earlier, a virtual I/O adaptor control table is provided for each server system. The virtual I/O adaptor control tables describe the correspondences between the physical I/O adaptors and the virtual I/O adaptors.

FIG. 3A is a diagram illustrating the virtual I/O adaptor control table 110 of the server system (0) 100.

The virtual I/O adaptor control table 110 contains I/O adaptor numbers 111, virtual I/O adaptor numbers 112, and virtual machine numbers 113, in correspondence with each other.

The I/O adaptor numbers 111 are the identifiers of the physical I/O adaptors. The virtual I/O adaptor numbers 112 are the identifiers of the virtual I/O adaptors. The virtual machine numbers 113 are the identifiers of the virtual machines residing in the server system (0) 100.

FIG. 3B is a diagram illustrating the virtual I/O adaptor control table 160 of the server system (1) 150.

The virtual I/O adaptor control table 160 contains I/O adaptor numbers 161, virtual I/O adaptor numbers 162, and virtual machine numbers 163, in correspondence with each other.

The I/O adaptor numbers 161 are the identifiers of the physical I/O adaptors. The virtual I/O adaptor numbers 162 are the identifiers of the virtual I/O adaptors. The virtual machine numbers 163 are the identifiers of the virtual machines residing in the server system (1) 150.

These virtual I/O adaptor control tables 110 and 160 show which virtual machines include which virtual I/O adaptors and which virtual I/O adapters are implemented by which physical I/O adaptors.

For example, according to the first entry of the virtual I/O adaptor control table 110 shown in FIG. 3A, the virtual I/O adaptor (0) of the virtual machine (0) is implemented by server resources of the physical I/O adaptor (0). Also, according to the first entry of the virtual I/O adaptor control table 160 shown in FIG. 3B, the virtual I/O adaptor (4) of the virtual machine (2) is implemented by server resources of the physical I/O adaptor (2).

FIG. 4 is a diagram illustrating the virtual channel adaptor control table 260 according to the first embodiment.

The virtual channel adaptor control table 260 describes correspondences between the physical channel adaptors and the virtual channel adaptors. Specifically, the virtual channel adaptor control table 260 contains virtual storage system numbers 261, virtual channel adaptor numbers 262, and channel adaptor numbers 263, in correspondence with each other.

The virtual storage system numbers 261 are the identifiers of the virtual storage systems in the storage system 200. The virtual channel adaptor numbers 262 are the identifiers of the virtual channel adaptors. The channel adaptor numbers 263 are the identifiers of the physical channel adaptors.

The virtual channel adaptor control table 260 shows which virtual storage systems include which virtual channel adaptors and which virtual channel adaptors are implemented by which physical channel adaptors.

For example, according to the first entry of the virtual channel adaptor control table 260, the virtual channel adaptor (0) of the virtual storage system (0) is implemented by storage resources of the physical channel adaptor (0). Also, according to the third entry, the virtual channel adaptor (2) of the virtual storage system (1) is implemented by storage resources of the physical channel adaptor (0).

FIG. 5 is a diagram illustrating the virtual path control table 310 according to the first embodiment.

The virtual path control table 310 describes the relations between the virtual machines and the virtual storage systems. In particular, the correspondence between a physical I/O adaptor and a physical channel adaptor specifies the physical path between the server system and the storage system. In other words, the virtual path control table 310 contains information about path between the virtual machines and the virtual storage systems.

The control terminal 300 generates the virtual path control table 310 by collecting together the information contained in the virtual I/O adaptor control table 110 of the server system (0) 100, the information contained in the virtual I/O adaptor control table 160 of the server system (1) 150, and the information contained in the virtual channel adaptor control table 260 of the storage system 200. In other words, the virtual path control table 310 is generated by uniting the virtual I/O adaptor control table 110, the virtual I/O adaptor control table 160, and the virtual channel adaptor control table 260, and so the virtual path control table 310 stores the control information in these tables.

Specifically, the virtual path control table 310 contains virtual storage system numbers 311, virtual channel adaptor numbers 312, channel adaptor numbers 313, I/O adaptor numbers 314, virtual I/O adaptor numbers 315, and virtual machine numbers 316, in correspondence with each other.

The virtual storage system numbers 311 correspond to the virtual storage system numbers 261 in the virtual channel adaptor control' table 260 shown in FIG. 4, and thus the virtual storage system numbers 311 are the identifiers of the virtual storage systems in the storage system 200.

The virtual channel adaptor numbers 312 correspond to the virtual channel adaptor numbers 262 in the virtual channel adaptor control table 260 shown in FIG. 4, and thus the virtual channel adaptor numbers 313 are the identifiers of the virtual channel adaptors.

The channel adaptor numbers 313 correspond to the virtual channel adaptor 263 in the virtual channel adaptor control table 260 shown in FIG. 4, and thus the channel adaptor numbers 313 are the identifiers of the physical channel adaptors.

The I/O adaptor numbers 314 correspond to the I/O adaptor numbers 111 and 161 in the virtual I/O adaptor control tables 110 and 160 shown in FIGS. 3A and 3B, and thus the I/O adaptor numbers 314 are the identifiers of the physical I/O adaptors.

The virtual I/O adaptor numbers 315 correspond to the virtual I/O adaptor numbers 112 and 162 in the virtual I/O adaptor control tables 110 and 160 shown in FIGS. 3A and 3B, and thus the virtual I/O adaptor numbers 315 are the identifiers of the virtual I/O adaptors.

The virtual machine numbers 316 correspond to the virtual machine numbers 113 and 163 in the virtual I/O adaptor control tables 110 and 160 shown in FIGS. 3A and 3B, and thus the virtual machine numbers 316 are the identifiers of the virtual I/O adaptors.

The virtual path control table 310 shows which virtual channel adaptors (the physical channel adaptors that implement the virtual channel adaptors) of which virtual storage systems are connected to which virtual I/O adaptors (the physical I/O adaptors that implement the virtual I/O adaptors) of which virtual machines.

In other words, the correspondence between a channel adaptor number 313 and an I/O adaptor number 314 defines the connection between the physical I/O adaptor and the physical channel adaptor. The connection shows routing information about the physical path between the server system and the storage system.

For example, according to the first entry of the virtual path control table 310, the virtual channel adaptor (0) of the virtual storage system (0) is implemented by storage resources of the physical channel adaptor (0). Also, the virtual I/O adaptor (0) of the virtual machine (0) is implemented by server resources of the physical I/O adaptor (0). The virtual channel adaptor (0) implemented by the physical channel adaptor (0) corresponds to the virtual I/O adaptor (0) implemented by the physical I/O adaptor (0).

Similarly, according to the second entry of the virtual path control table 310, the virtual channel adaptor (1) implemented by the physical channel adaptor (1) corresponds to the virtual I/O adaptor (1) implemented by the physical I/O adaptor (1).

In other words, the virtual storage system (0) and the virtual machine (0) are connected by the physical channel adaptor (0) and the physical I/O adaptor (0), and also by the physical channel adaptor (1) and the physical I/O adaptor (1).

FIG. 6 is a diagram illustrating the server resources control table 115 according to the first embodiment.

As stated earlier, the server resources control table 115 is provided in the hypervisor 103 (in the server system (0) 100).

The server resources control table 115 stores virtual machine numbers 701, CPU allocation 702, memory capacities 703, and I/O adaptor numbers 704 in association with each other. The server resources control table 115 thus stores the associations of the resources of the server system (0) 100 (the CPU (0) 101, the main memory (0) 104, and the I/O adaptors 106 and 107).

The virtual machine numbers 701 indicate the virtual machines in the server system (0) 100. The CPU allocation 702 indicates percentages of areas of the CPU (0) 101 in the server system (0) 100 that are allocated to the individual virtual machines. The memory capacities 703 indicate capacities of the main memory (0) 104 that are allocated to the virtual machines. The I/O adaptor numbers 704 indicate I/O adaptors that handle access from the virtual machines to the storage system 200.

The administrator specifies allocation of the server resources by means of the control terminal 300 and the server resources control table 115 is generated as per the administrator's setting.

The server resources control table 165 in the server system (1) 150 (the hypervisor 153) has the same items as the server resources control table 115 described above, and thus the server resources control table 165 stores the associations of the resources of the server system (1) 150.

The control terminal 300 possesses the server resources control table 320. The server resources control table 320 has the same items as the server resources control table 115 described above, and thus the server resources control table 320 stores the associations of the resources of the server system (0) 100 and the associations of the resources of the server system (1) 150.

FIG. 7 is a diagram illustrating the storage resources control table 265 according to the first embodiment.

As stated earlier, the storage resources control table 265 is provided in the storage hypervisors 214 and 224 (in the storage system 200).

The storage resources control table 265 stores virtual machine numbers 601, virtual disk numbers 602, disk cache capacities 603, CPU numbers 604, and I/O adaptor numbers 605 in association with each other. The storage resources control table 265 thus stores the associations of the resources of the storage system 200 (the physical disk drives 236, CPUs 211 and 221, the channel adaptors 231 to 234, and the disk cache 238).

The virtual machine numbers 601 correspond to the virtual machines in the server systems 100 and 150. The virtual disk numbers 602 are numbers of the virtual disks 244 and 254 configured by the storage hypervisors 214 and 224, which indicate virtual disks that are allocated to the virtual machines defined by the virtual machine numbers 601. In other words, the virtual disk 244 has areas corresponding to virtual disk numbers 121 and 122 and the virtual disk 254 has areas corresponding to virtual disk numbers 16 and 17. The virtual disks may be logical units.

The disk cache capacities 603 show capacities of the disk caches 243 and 253 that are allocated to the virtual machines defined by the virtual machine numbers 601. The CPU numbers 604 show the control CPUs 211 and 221 that control access from the virtual machines defined by the virtual machine numbers 601.

The channel adaptor numbers 605 show the channel adaptors 231 to 234 that handle access from the virtual machines defined by the virtual machine numbers 601 (access to the virtual disks defined by the virtual disk numbers 602).

In other words, the two virtual disks 121 and 122 are allocated to the virtual machine (0) 130. In order to access the virtual disks 121 and 122, the virtual machine (0) 130 can use 512 megabytes of disk cache. The virtual machine (0) 130 accesses the virtual disks 121 and 122 through the two I/O adaptors (0) and (1). The two CPUs 2 and 3 operate to process the access from the virtual machine (0) 130 to the virtual disks 121 and 122.

The administrator specifies allocation of the storage resources by means of the control terminal 300 and the storage resources control table 265 is generated as per the administrator's setting.

Also, the control terminal 300 has the storage resources control table 330. The storage resources control table 330 contains the same items as the storage resources control table 265 described above, and stores the associations of the resources of the storage system 200.

The server resources control table 115 shown in FIG. 6 describes the CPU allocation, but the CPU numbers may be used. Also, while the storage resources control table 265 shown in FIG. 7 describes the CPU numbers, CPU allocation may be used.

Figure 8:
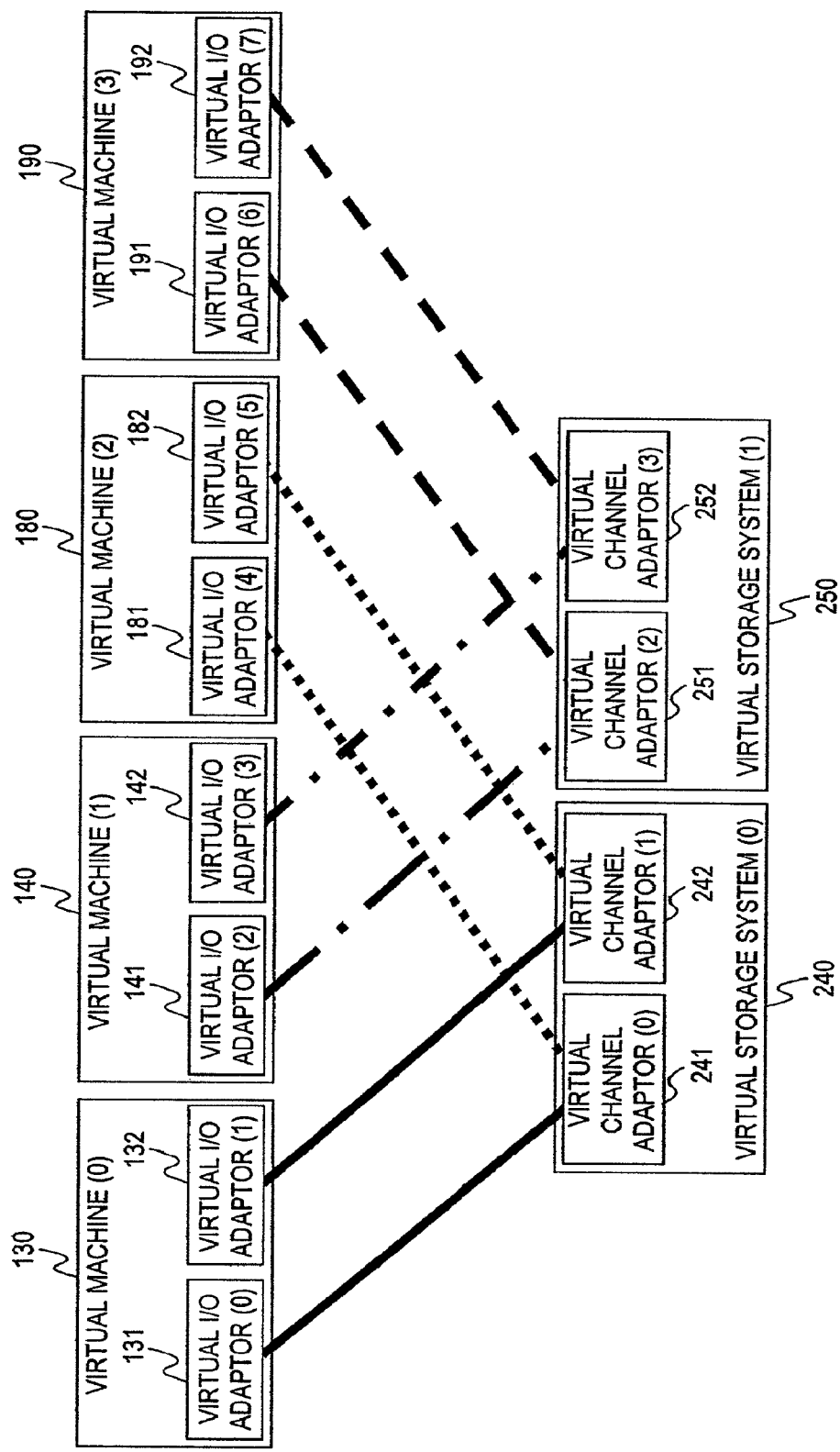
FIG. 8 is a diagram illustrating connections in the computer system according to the first embodiment.

FIG. 8 is a diagram illustrating the connections in the computer system according to the first embodiment. Unlike FIG. 2 that shows the functions of the computer system in the hardware perspective, FIG. 8 shows the connections in the software perspective (seen from the virtual world). Therefore, FIG. 8 does not show the hardware configuration of the computer system (e.g., the I/O adaptors 106 etc. and the channel adaptors 231 etc.).

The virtual machine (0) 130 includes two virtual I/O adaptors (0) 131 and (1) 132. The virtual storage system (0) 240 has two virtual channel adaptors (0) 241 and (1) 242. The virtual I/O adaptor (0) 131 is connected with the virtual channel adaptor (0) 241 and the virtual I/O adaptor (1) 132 is connected with the virtual channel adaptor (1) 242.

Similarly, the virtual machine (1) 140 includes two virtual I/O adaptors (2) 141 and (3) 142. The virtual storage system (1) 250 has two virtual channel adaptors (2) 251 and (3) 252. The virtual I/O adaptor (2) 141 is connected with the virtual channel adaptor (2) 251 and the virtual I/O adaptor (3) 142 is connected with the virtual channel adaptor (3) 252.

Also, the virtual machine (2) 180 includes two virtual I/O adaptors (4) 181 and (5) 182. The virtual I/O adaptor (4) 181 is connected with the virtual channel adaptor (0) 241 and the virtual I/O adaptor (5) 182 is connected with the virtual channel adaptor (1) 242.

Similarly, the virtual machine (3) 190 includes two virtual I/O adaptors (6) 191 and (7) 192. The virtual I/O adaptor (6) 191 is connected with the virtual channel adaptor (2) 251 and the virtual I/O adaptor (7) 192 is connected with the virtual channel adaptor (3) 252.

In other words, FIG. 8 shows the relations among the virtual machine numbers 316, the virtual I/O adaptor numbers 315, the virtual channel adaptor numbers 312, and the virtual storage system numbers 311 in the virtual path control table 310 shown in FIG. 5.

Figure 9:
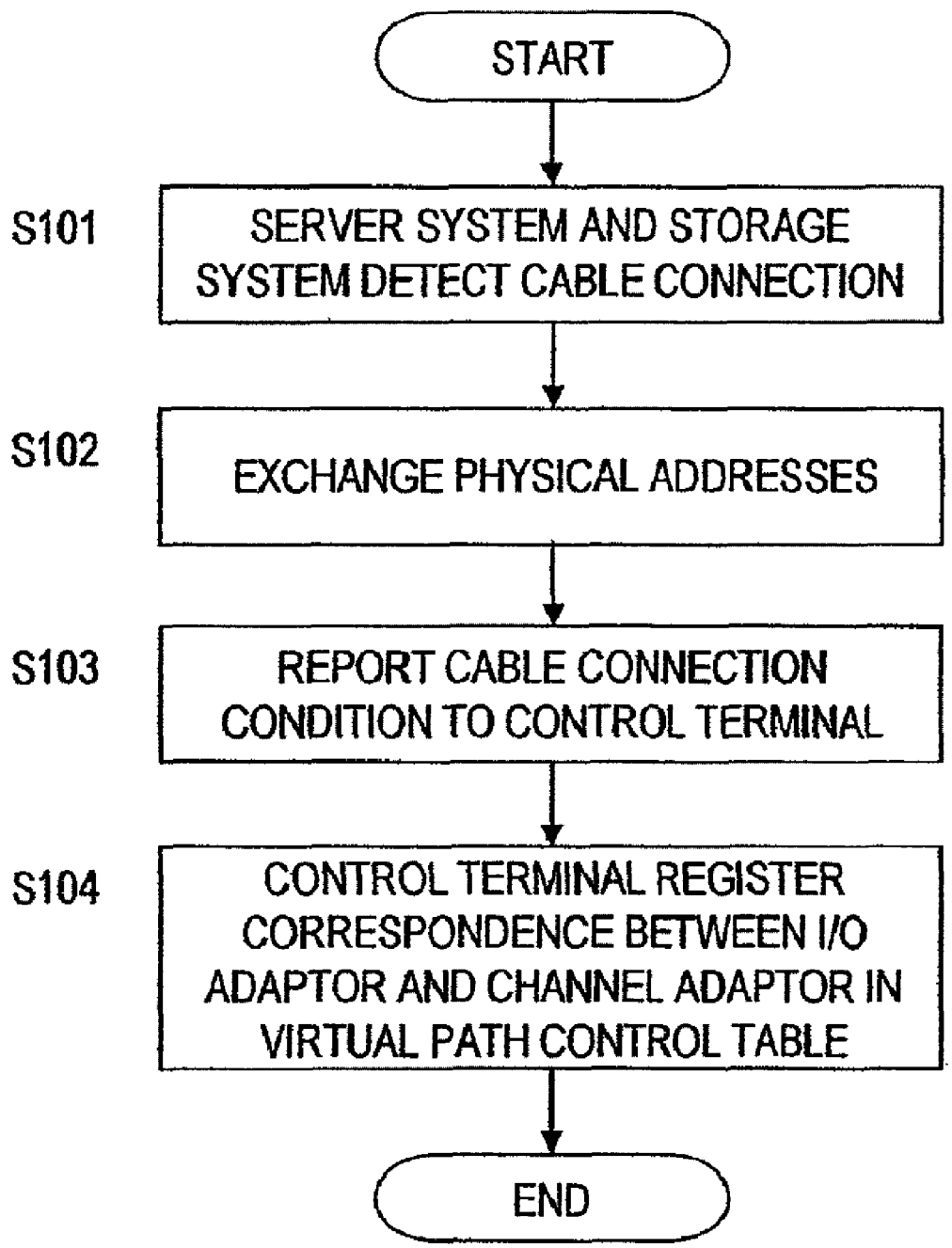
FIG. 9 is a flowchart of a cable connection process according to the first embodiment.

FIG. 9 is a flowchart of a cable connection process in the computer system according to the first embodiment. This cable connection process is performed in the server system (0) 100. The same process is performed also in the server system (1) 150 and the storage system 200.

First, an I/O adaptor of the server system (0) 100 (a channel adaptor of the storage system 200) detects a cable connection (S 101).

Next, the server system (0) 100 exchanges physical addresses with the apparatus coupled by the network 410 (S102). For example, when the server device (0) 100 is connected to the storage system 200, the server system (0) 100 sends an inquiry to the connected system for a physical address and obtains a physical address of a channel adaptor of the storage system 200. The physical addresses exchanged in the step S 102 can be any addresses that uniquely identify the ports of adapters to which the cable (I/O channel) is connected.

For example, World Wide Names (WWNs) are exchanged according to the Fibre Channel protocol. In particular, in this invention, World Wide port Names may be used to specify the ports. With the iSCSI protocol, MAC addresses obtained by an address resolution technique (e.g. ARP) may be exchanged.

Then, the obtained physical addresses are reported to the hypervisor 103.

Next, the hypervisor 103 notifies the control terminal 300 of the obtained cable connection state (the physical address of the I/O adaptors and the physical address of the channel adaptors) through the network 410 (S103).

The control terminal 300 receives the physical address of the I/O adaptor and the physical addresses of the channel adaptor and then waits for a notification of a physical address from the storage system that includes the connected channel adaptors.

Then, having received the physical addresses from both of the connected systems, the control terminal 300 registers the correspondence between the I/O adaptors and the channel adaptors in the virtual path control table 310 (S104). In other words, in the virtual path control table 310, the control terminal 300 registers channel adaptor numbers 313 and I/O adaptor numbers 314 of the same number as the detected cables.

Figure 10:
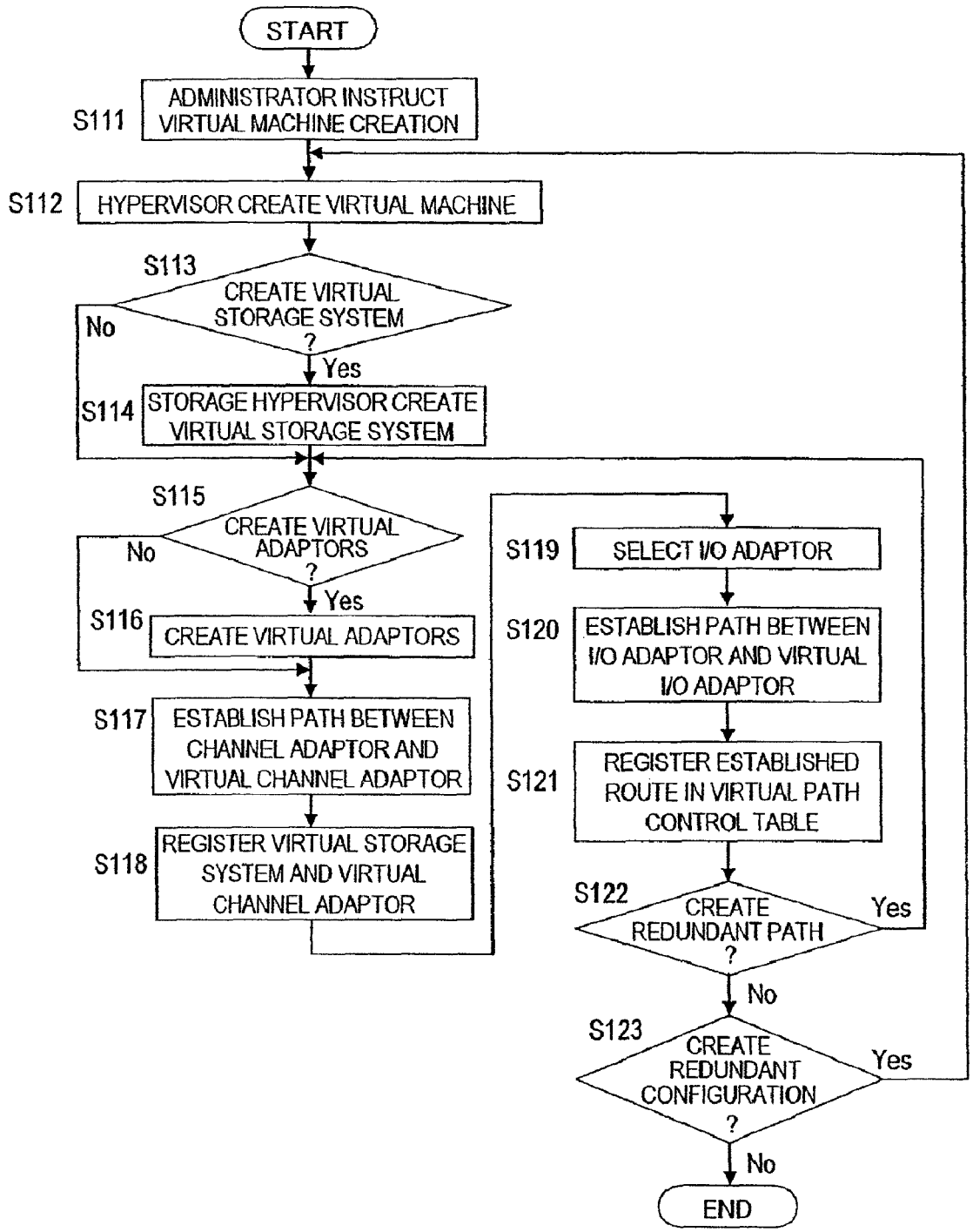
FIG. 10 is a flowchart of a virtual machine creation process according to the first embodiment.

FIG. 10 is a flowchart of a process of creating a virtual machine in the computer system according to the first embodiment. The virtual machine creation process is performed in the server system (0) 100. The same process is performed also in the server system (1) 150.

First, the administrator operates the control terminal 300 to set allocation of server resources of the server system (0) 100 and gives an instruction to create a virtual machine (S111). The control terminal 300 sends the resource allocation to the server system (0) 100.

The server system (0) 100 receives the virtual machine creation instruction from the control terminal 300 and then the hypervisor 103 creates a virtual machine by allocating server resources of the server system (0) 100, other than I/O adaptors, according to the received virtual machine creation instruction (S 112).

Then, when completing the virtual machine creation, the hypervisor 103 notifies the control terminal 300 of the completion of the virtual machine creation.

The control terminal 300 receives the notification of the completion of the virtual machine creation from the server system (0) 100 and then checks whether a virtual storage system should be created in the storage system 200 (S113).

Then, when the control terminal 300 judges that a virtual storage system should be created, the flow moves to a step S114. On the other hand, when the control terminal 300 judges that there is no need to create a virtual storage system, the flow moves to a step S115.

For example, when a virtual machine is created for the first time in the server system (0) 100, it is necessary to create a virtual storage system that the virtual machine accesses. On the other hand, when the created virtual machine uses a virtual storage system already created, then there is no need to newly create a virtual storage system.

In the step S114, the control terminal 300 sends allocation of storage resources of the storage system 200 to the storage system 200 and gives an instruction to create a virtual storage system. The storage system 200 receives the virtual storage system creation instruction from the control terminal 300 and then the storage hypervisor 214, 224 creates a virtual storage system by allocating the storage resources of the storage system 200, other than channel adaptors, according to the received virtual storage system creation instruction (S114).

Then, when completing the virtual storage system creation, the storage hypervisor 214, 224 notifies the control terminal 300 of the completion of the virtual storage system creation.

The control terminal 300 receives the notification of the completion of the virtual storage system creation from the storage system 200 and then checks whether virtual adaptors (virtual channel adaptors and virtual I/O adaptors) should be created (S115).

Then, when the control terminal 300 judges that virtual adaptors should be created, the flow moves to a step S 116. On the other hand, when the control terminal 300 judges that there is no need to create virtual adaptors, the flow moves to a step S117.

For example, when a virtual machine is created for the first time in the server system (0) 100, it is necessary to create virtual adaptors for use by the virtual machine. On the other hand, there is no need to create virtual adaptors when already created virtual adaptors are used, or when redundant ports are used.

In the step S116, the resources of an I/O adaptor (or a channel adaptor) are allocated to create a virtual adaptor (S 116). Virtual I/O adaptors are created by the hypervisor 103, 153, and virtual channel adaptors are created by the storage hypervisor 214, 224.

After creating a virtual I/O adaptor, the hypervisor 103 adds an entry to the virtual I/O adaptor control table 110. In this process, the virtual I/O adaptor number 112 and the virtual machine number 113 are registered in the virtual I/O adaptor control table 110. In the step S112, the I/O adaptor number 111 is blank because I/O adaptor resources have not been allocated.

Also, the storage hypervisor 214, after creating a virtual channel adaptor, adds an entry to the virtual channel adaptor control table 260. In this process, the virtual storage system number 261 and the virtual channel adaptor number 262 are registered in the virtual channel adaptor control table 260. In the step S114, the channel adaptor number 263 is blank because channel adaptor resources have not been allocated.

After that, a path is established between the channel adaptor and the virtual channel adaptor (S117). In other words, the channel adaptor number 263 corresponding to the virtual channel adaptor number 262 is registered in the virtual channel adaptor control table 260. Thus, the virtual channel adaptor control table 260 is completed and a path in the server system (0) 100 is established.

Next, the storage hypervisor 214, 244 sends, to the control terminal 300, the virtual storage system number 261, the virtual channel adaptor number 262, and the channel adaptor number 263 in the virtual channel adaptor control table 260. The control terminal 300 receives the information contained in the virtual channel adaptor control table 260 and then searches and retrieves an entry corresponding to the channel adaptor number 313 in the virtual path control table 310. Then, the control terminal 300 registers the received information in the virtual storage system number 311 and the virtual channel adaptor number 312 of the retrieved entry (S118). The control terminal 300 is now capable of managing the relation from the virtual storage system to the channel adaptor.

Next, using the control terminal 300, the administrator selects an I/O adaptor that is connected to the target channel adaptor (S119). In this process, the virtual machine control program 301 may indicate one or a plurality of I/O adaptors that are physically connected to the target channel adaptor so that the administrator can select one. The control terminal 300 sends information about the selected I/O adaptor to the hypervisor 103.

The hypervisor 103 receives the information about the selected I/O adaptor and creates a path between the I/O adaptor and the virtual I/O adaptor (S 120). In other words, the channel adaptor number 263 corresponding to the virtual channel adaptor number 262 is registered in the virtual channel adaptor control table 260. Thus, the virtual I/O adaptor control table 110 is completed and a path in the server system is established.

Next, the hypervisor 103 sends, to the control terminal 300, the I/O adaptor number 111, the virtual I/O adaptor number 112, and the virtual machine number 113 in the virtual I/O adaptor control table 110. The control terminal 300 receives the information contained in the virtual I/O adaptor control table 110 and then searches and retrieves an entry corresponding to the I/O adaptor number. Then, the control terminal 300 registers the received information in the virtual I/O adaptor number 315 and the virtual machine number 316 of the retrieved entry (S121). Thus, the route from the virtual storage system to the virtual machine has been registered in the virtual path control table 310. The control terminal 300 is now capable of managing the relation from the virtual storage system to the virtual machine.

After that, whether a redundant path should be created is checked (S122). When it is judged that a redundant path should be created, the flow returns to the step S115 and checks whether virtual adaptors used for the redundant path should be created. Subsequently, a redundant path is created through the process steps S116 to S 122.

When adaptors are newly created for the creation of a redundant path (when there is no redundant adaptors), the flow may return to the step S116. When new adaptors are not created for the creation of a redundant path (when there are redundant adaptors), the flow may return to the step S117.

After the completion of redundant path creation, whether a redundant configuration should be created is checked (S 123). When it is judged that a redundant configuration should be created, the flow returns to the step S112 and virtual machines used in the redundant configuration is created through the process steps S112 to S 122.

Figure 11:
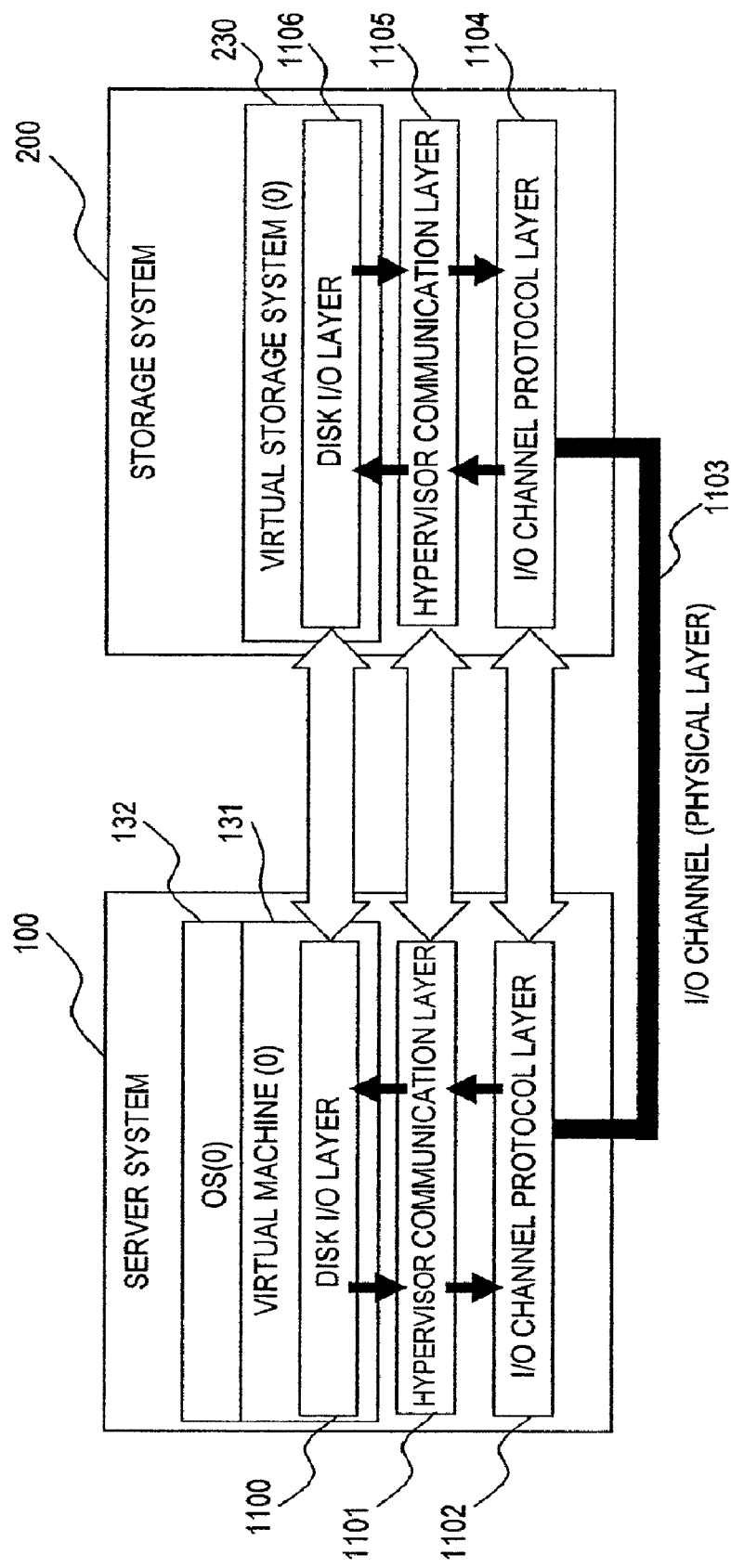
FIG. 11 is a diagram illustrating the structure of I/O channel communication protocol layers according to the first embodiment.

FIG. 11 is a diagram illustrating the structure of communication protocol layers for the I/O channels 400 of the computer system according to the first embodiment.

When accessing a logical unit in the storage system 200, the OS (0) 135 on the virtual machine (0) 130 processes input/output according to a disk I/O protocol (e.g. the SCSI standard). In this embodiment, the disk I/O protocol layer is referred to as "disk I/O layer" 1100, 1106.

While a disk I/O command issued by the OS (0) 135 is received by the hypervisor 103, a communication protocol layer exists also between the hypervisor 103 and the storage hypervisors 214 and 224. This communication protocol layer is referred to as "hypervisor communication layer" 1101, 1105.

Also, in this embodiment, a layer that handles general communication by the I/O channels 400 is referred to as "I/O channel protocol layer" 1102, 1104. Also, a layer of hardware, such as a physical communication medium, is referred to as "physical layer" 1103.

When the communication protocol of the I/O channels 400 has such a layered structure, the disk I/O layers 1101 and 1106 and the hypervisor communication layers 1101 and 1105 are not affected even when the communication medium forming the I/O channels 400 is changed.

The disk I/O command issued by the OS (0) 135 is sent to the virtual machine (0) 130.

The virtual machine (0) 130 issues that I/O command to the virtual storage system (0) 240. In reality, this I/O command is received by the hypervisor 103.

The hypervisor 103 adds information to the disk I/O command (see FIG. 12) and sends the disk I/O command to the storage hypervisors 214 and 224. The storage hypervisors 214 and 224 receive the command, extract the disk I/O command, and send it to the virtual storage system (0) 240.

Communication with such a layered structure makes the OS (0) 135 recognize as if it were communicating directly with the virtual storage system (0).

Figure 12:
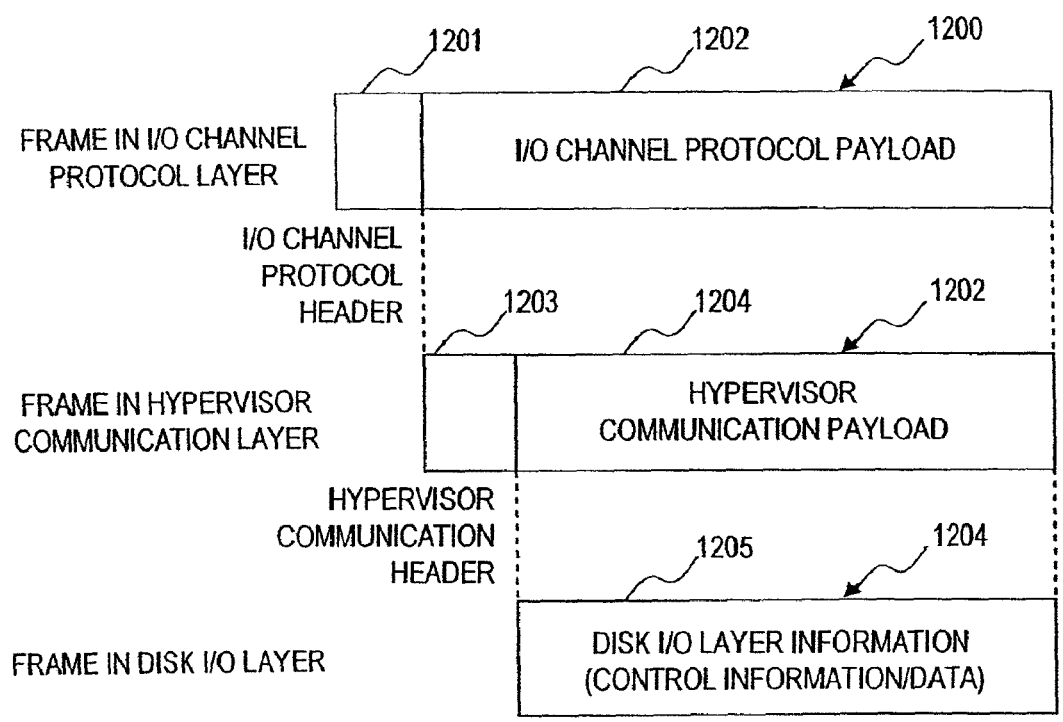
FIG. 12 is a diagram illustrating information transmitted between the server systems and the storage system according to the first embodiment.

FIG. 12 is a diagram illustrating the information transmitted between the server system (0) 100 and the storage system 200 according to the first embodiment.

The I/O channels 400 of this embodiment conduct communication using a frame 1200 as a unit. This is the same in common standards like the Fibre Channel and Ethernet. The frame 1200 is formed of an I/O channel protocol header 1201 and an I/O channel protocol payload 1202.

The I/O channel protocol header 1201 contains control information required for communication in the I/O channel protocol layers 1102 and 1104. Specifically, the I/O channel protocol header 1201 contains an identifier of the source and an identifier of the destination. The I/O channel protocol payload 1202 is information transmitted in the I/O channel protocol layers 1102 and 1104, and the I/O channel protocol layers 1102 and 1104 have no concern with the contents.

The I/O channel protocol payload 1202 is formed of a hypervisor communication header 1203 and a hypervisor communication payload 1204.

The hypervisor communication header 1203 contains control information required for communication in the hypervisor communication layers 1101 and 1105. The contents of the hypervisor communication header 1203 will be fully described later with FIG. 13. The hypervisor communication payload 1204 is data transmitted in the hypervisor communication layers 1101 and 1105, and the hypervisor communication layers 1101 and 1105 have no concern with the contents.

In this embodiment, the hypervisor communication payload 1204 is formed of information required for communication in the disk I/O layers 1100 and 1106. Specifically, the information includes a disk I/O command and transferred data. In this embodiment, the hypervisor communication payload 1204 contains information in the disk I/O layers 1100 and 1106 because the disk I/O layers reside above the hypervisor communication layers 1101 and 1105. However, in communication between the hypervisor and storage hypervisor, information of a type other than disk I/O is contained. In other words, when communication for a purpose other than disk I/O is made between the hypervisor and storage hypervisor, a protocol other than the disk I/O protocol is defined for the communication. The information of a type other than disk I/O is information conforming to the protocol.

Figure 13:
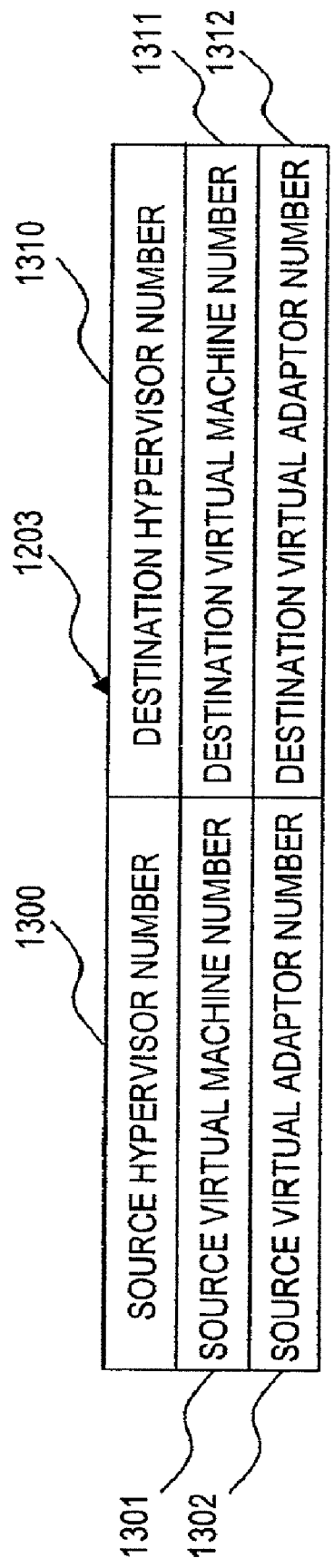
FIG. 13 is a diagram illustrating the contents of a hypervisor communication header according to the first embodiment.

FIG. 13 is a diagram illustrating the contents of the hypervisor communication header 1203 according to the first embodiment.

The hypervisor communication header 1203 contains a source hypervisor number 1300, a source virtual machine number 1301, a source virtual adaptor number 1302, a destination hypervisor number 1310, a destination virtual machine number 1311, and a destination virtual adaptor number 1312. In this embodiment, the hypervisors and the storage hypervisors are provided with unique identifiers so that systems including a plurality of server systems 100 and 150 and a plurality of storage systems 200 can be dealt with.

The source hypervisor number 1300 is an identifier of the hypervisor or storage hypervisor that has sent this frame.

The destination hypervisor number 1310 is an identifier of the hypervisor or storage hypervisor that should receive this frame.

The source virtual machine number 1301 is an identifier of the virtual machine or virtual storage system that has sent this frame.

The destination virtual machine number 1311 is an identifier of the virtual machine or virtual storage system that should receive this frame.

The source virtual adaptor number 1302 is an identifier of the virtual I/O adaptor or virtual channel adaptor that has sent this frame.

The destination virtual adaptor number 1312 is an identifier of the virtual I/O adaptor or virtual channel adaptor that should receive this frame.

Figure 14:
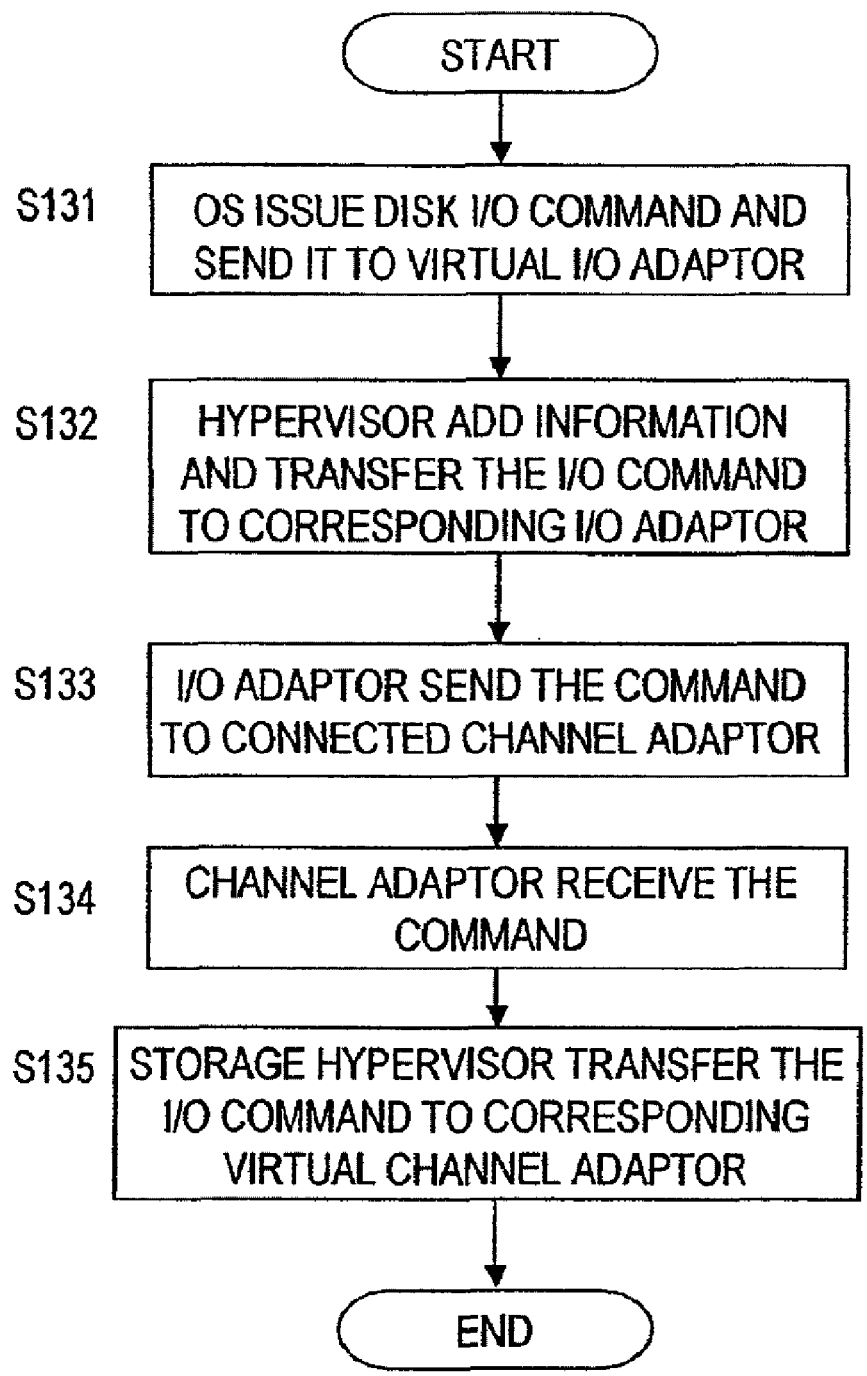
FIG. 14 is a flowchart of a disk I/O command transmission process according to the first embodiment.

FIG. 14 is a flowchart of a process of sending a disk I/O command according to the first embodiment. While the flowchart describes an example in which the virtual machine (0) 130 accesses the virtual storage system (0) 240 through the I/O adaptor (0) 106 and the channel adaptor (0) 231, the same process can be performed also with other virtual machines 140, 180, and 190 and virtual storage system 250.

When a disk I/O command is issued, the OS (0) 135 sends the disk I/O command to the virtual machine (0) 130 (the virtual I/O adaptor (0) 131) (S131). In reality, the disk I/O command sent to the virtual I/O adaptor (0) 131 is received by the hypervisor 103.

The hypervisor 103 then adds information to the disk I/O command (see FIG. 12) and transfers the disk I/O command to the physical I/O adaptor (0) 106 (S132).

The I/O adaptor (0) 106 sends the disk I/O command to the connected channel adaptor (0) 231 (the virtual storage system (0) 240) (S133).

Then, the channel adaptor (0) 231 receives the disk I/O command sent from the I/O adaptor (0) 106 (S134). In reality, the disk I/O command received by the channel adaptor (0) 231 is received by the storage hypervisor 214.

The storage hypervisor 214 extracts the destination virtual adaptor number 1312 contained in the hypervisor communication header 1203 of the received disk I/O command. Then, the storage hypervisor 214 transfers the disk I/O command to the extracted virtual channel adaptor (0) 241 (S 135).

Figure 15:
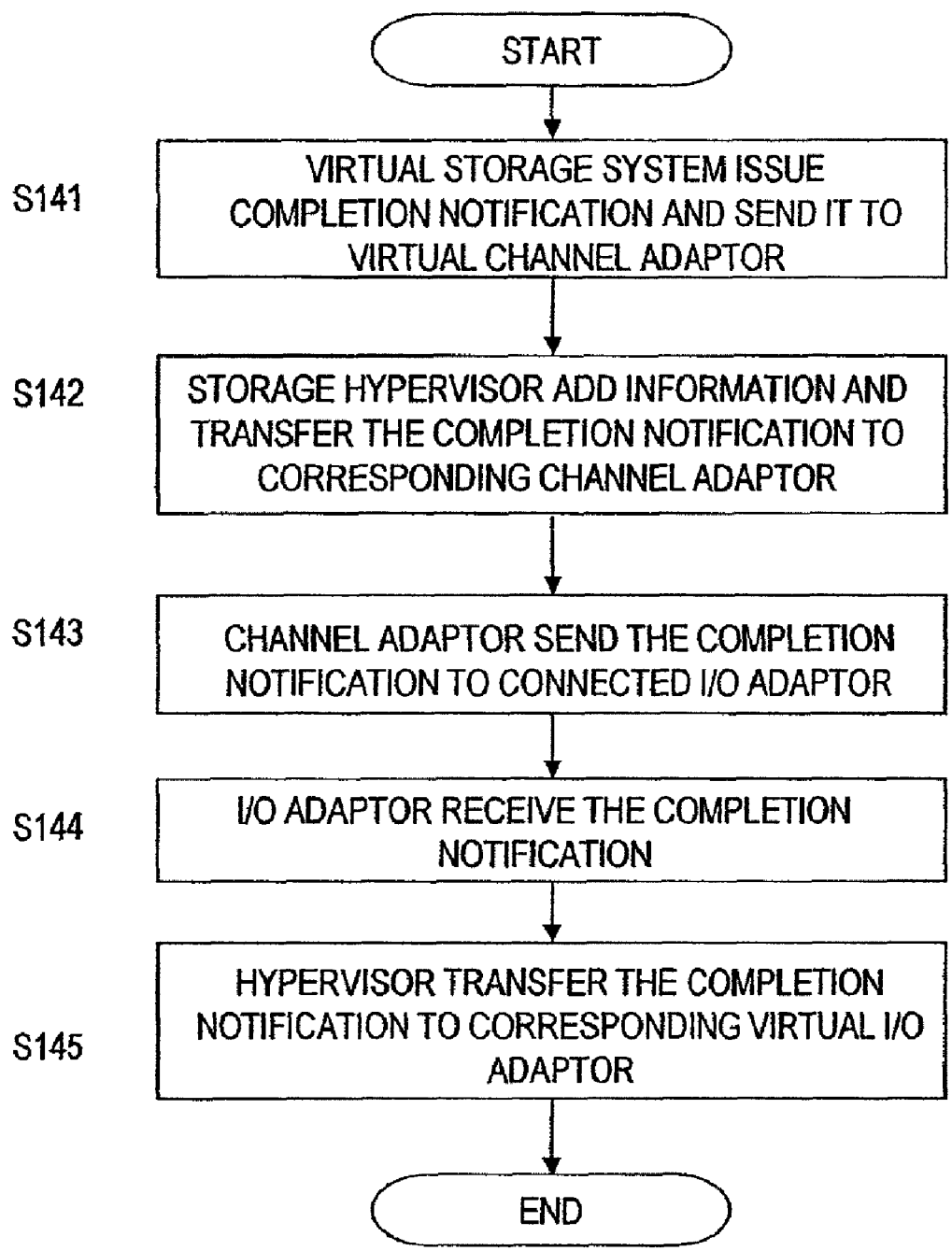
FIG. 15 is a flowchart of a disk I/O command completion notification process according to the first embodiment.

FIG. 15 is a flowchart of a process of completion notification of a disk I/O command according to the first embodiment. While the flowchart describes an example in which the virtual storage system (0) 240 accesses the virtual machine (0) 130 through the channel adaptor (0) 231 and the I/O adaptor (0) 106, the same process can be performed also with other virtual storage system 250 and virtual machines 140, 180, and 190.

When the virtual storage system (0) 240 receives a disk I/O command from the virtual machine (0) 130, the virtual storage system (0) 240 obtains the virtual disk number that is the target of the access by the disk I/O command to specify the accessed virtual disk and reads/writes data to/from the corresponding virtual disk 244.

In this process, the storage hypervisor 214 translates the virtual block address of the accessed virtual disk 244 to a physical block address of the physical disk drive 236. The access to the virtual disk 244 is then converted to access to the physical disk drive 236. Then, the storage hypervisor 214 accesses the physical disk drive 236 and reads/writes data.

When completing the data read from or data write to the physical disk, the virtual storage system (0) 240 issues a disk I/O completion notification. The virtual storage system (0) 240 then sends the disk I/O completion notification to the virtual channel adaptor (0) 241 (S141). In reality, the disk I/O completion notification sent to the virtual channel adaptor (0) 241 is received by the storage hypervisor 214.

The storage hypervisor 214 then adds information to the disk I/O completion notification (see FIG. 12) and transfers the disk I/O completion notification to the physical channel adaptor (0) 231 (S142).

The channel adaptor (0) 231 sends the disk I/O completion notification to the connected I/O adaptor (0) 106 (the virtual machine (0) 130) (S143).

Then, the I/O adaptor (0) 106 receives the disk I/O completion notification sent from the channel adaptor (0) 231 (S144). In reality, the disk I/O completion notification received by the I/O adaptor (0) 106 is received by the hypervisor 103.

The hypervisor 103 extracts the destination virtual adaptor number 1312 contained in the hypervisor communication header 1203 of the received disk I/O completion notification. Then, the hypervisor 103 transfers the disk I/O completion notification to the extracted virtual I/O adaptor (0) 131 (S145).

Figure 16:
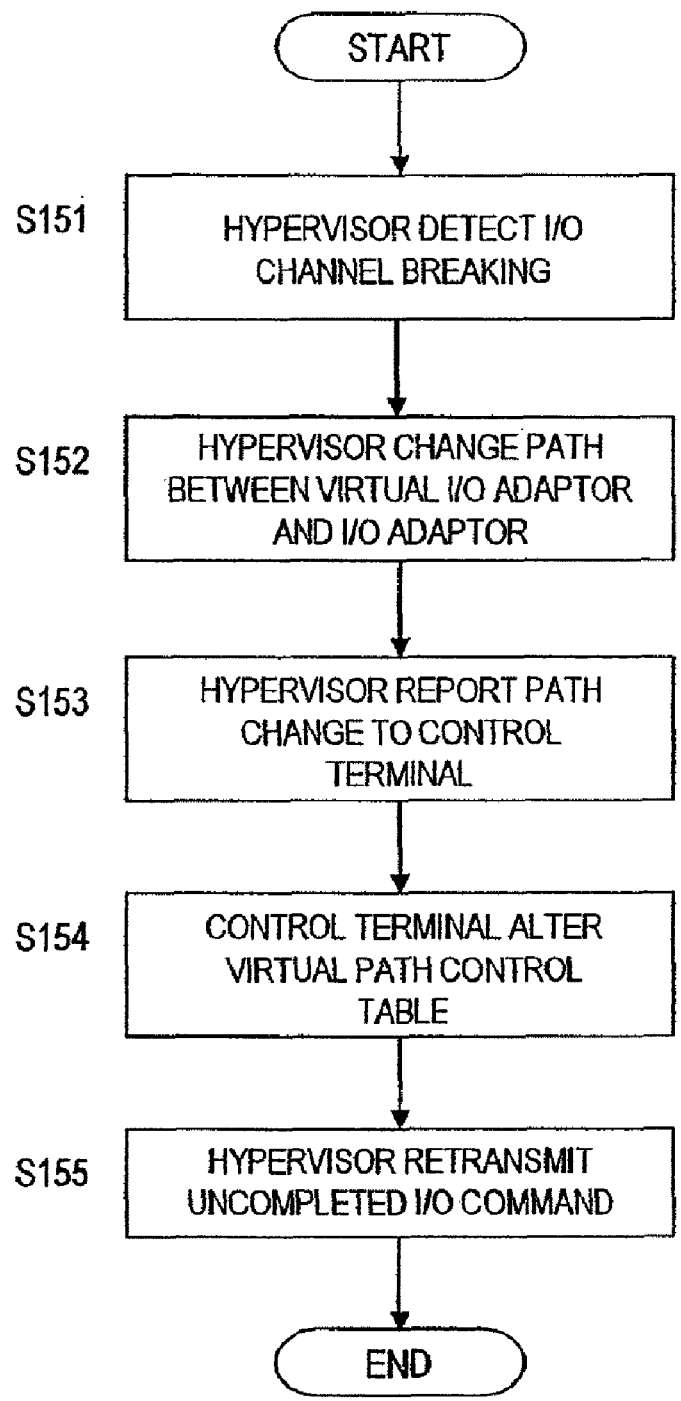
FIG. 16 is a flowchart of a fault handling process according to the first embodiment.

FIG. 16 is a flowchart of a process of handling a fault according to this embodiment. While the flowchart describes an example in which the hypervisor 103 detects a fault of the I/O channels 400, the hypervisor 153 can detect faults in the same way.

First, the hypervisor 103 detects a breaking of I/O channel 400 (S151). This fault handling process is not performed when no breaking of I/O channels 400 is detected.

As for the breaking of I/O channels 400, an I/O channel 400 is judged to be broken when, for example, the virtual machine 130 of the server system (0) 100 has issued a disk I/O command but does not receive a disk I/O completion notification before a timeout occurs. A breaking detecting circuit for detecting breaking of I/O channels 400 may be provided in the server system (0) 100 to monitor for breaking.

In other words, this fault handling process may be executed at the moment of an occurrence of a disk I/O, or may be executed otherwise.

Next, in order to keep the connection between the virtual machine (0) 130 and the virtual storage system (0) 240, the hypervisor 103 changes the connection path between the virtual I/O adaptor (0) 131 and the physical I/O adaptor (0) 106 (the connection path in the server system (0) 100) (S152). For example, the hypervisor 103 sets up a connection path between the virtual I/O adaptor (0) 131 and the I/O adaptor (1) 107.

Then, the contents of the virtual I/O adaptor control table 110 are altered accordingly. In this embodiment, the I/O adaptor number 111 is changed to "1" in the entry in which the I/O adaptor number 111 is "0", the virtual I/O adaptor number 112 is "0", and the virtual machine number 113 is "0".

Alternatively, instead of changing the contents of the entry of the detected fault, an entry may be added for the newly established path.

Subsequently, the hypervisor 103 notifies the control terminal 300 of the change of the connection path between the virtual I/O adaptor and the physical I/O adaptor (the connection path in the server system (0) 100) (S153).

The control terminal 300 receives the path change notification from the hypervisor 103 and alters the virtual path control table 310 (S 154). Specifically, the I/O adaptor number 314 is changed to "1" in the entry with the I/O adaptor number 314 of "0", the virtual I/O adaptor number 315 of "0", and the virtual machine number 316 of "0".

Then, the control terminal 300 notifies the hypervisor 103 of the completion of the alteration of the virtual path control table 310.

The hypervisor 103 receives the alteration completion notification from the control terminal 300 and retransmits uncompleted transmit information (e.g., an issued disk I/O command for which completion notification has not been received) to the I/O adaptor that forms the new path (S155).

Figure 17:
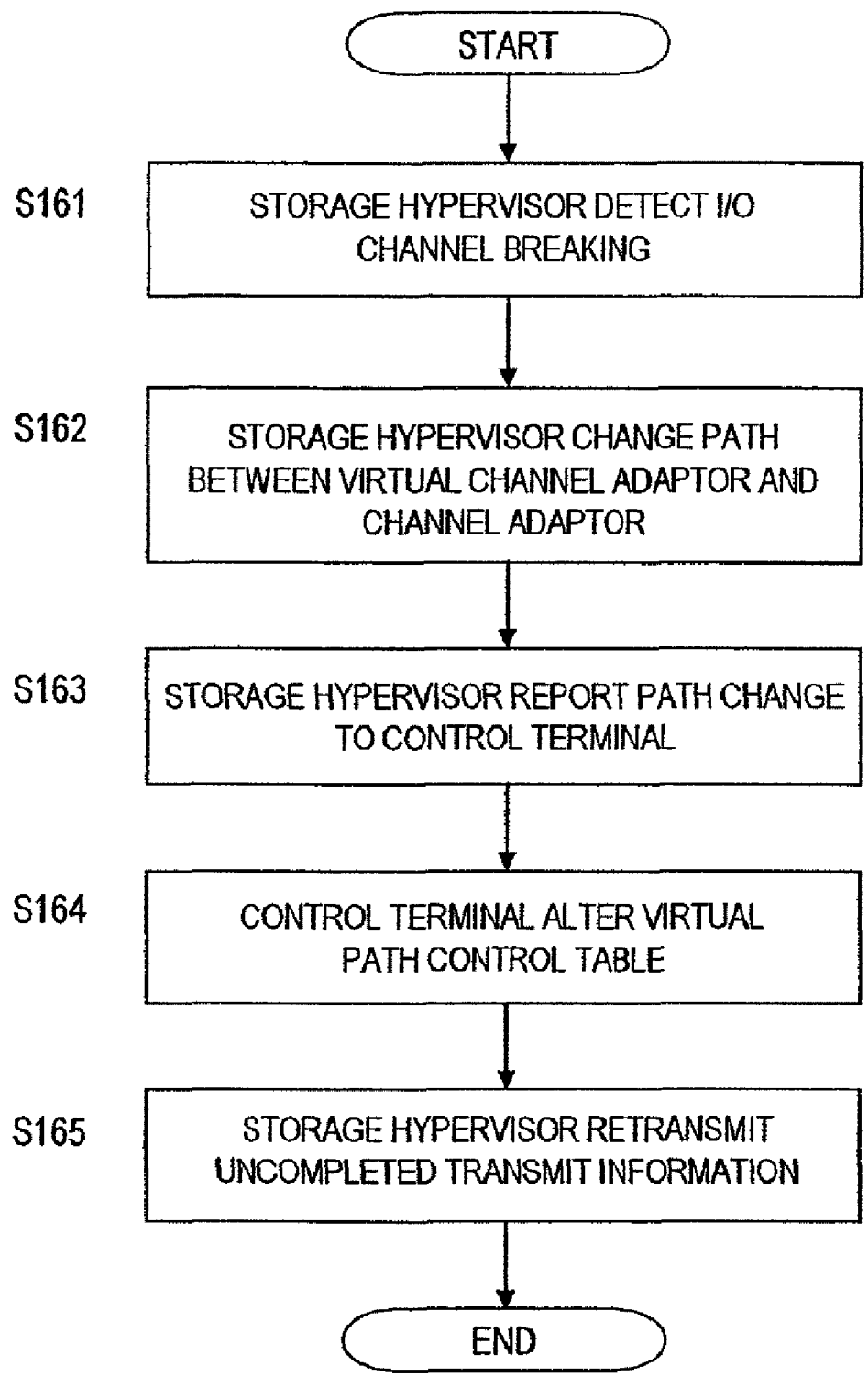
FIG. 17 is a flowchart of a fault handling process according to the first embodiment.

FIG. 17 is a flowchart of a process of handling a fault according to this embodiment. While the flowchart describes an example in which the storage hypervisor 214 detects a fault of the I/O channels 400 in the I/O channel protocol layer 1104, the storage hypervisor 224 can detect faults in the same way.

First, the storage hypervisor 214 detects a breaking of I/O channel 400 (S161). This fault handling process is not performed when no breaking of I/O channels 400 is detected.

As for the breaking of I/O channels 400, an I/O channel 400 is judged to be broken when, for example, the virtual storage system 210 of the storage system 200 has issued a disk I/O completion notification but does not receive a confirmation signal with respect to the disk I/O completion notification before a timeout occurs. A breaking detecting circuit for detecting breaking of I/O channels 400 may be provided in the storage system 200 to monitor for breaking.

In other words, this fault handling process may be executed at the moment of an occurrence of a disk I/O, or may be executed otherwise.

Next, in order to keep the connection between the virtual storage system (0) 240—and the virtual machine (0) 130, the storage hypervisor 214 changes the connection path between the virtual channel adaptor (0) 241 and the physical channel adaptor (0) 231 (the connection path in the storage system 200) (S162). For example, the storage hypervisor 214 sets up a connection path between the virtual channel adaptor (0) 241 and the channel adaptor (1) 232.

Then, the contents of the virtual channel adaptor control table 260 are altered accordingly. In this embodiment, the channel adaptor number 263 is changed to "1" in the entry in which the virtual storage system number 261 is "0", the virtual channel adaptor number 262 is "0", and the channel adaptor number 263 is "0".

Alternatively, instead of changing the contents of the entry of the detected fault, an entry may be added for the newly established path.

Subsequently, the storage hypervisor 214 notifies the control terminal 300 of the change of the connection path between the virtual I/O adaptor and the physical I/O adaptor (the connection path in the server system (0) 100) (S 163).

The control terminal 300 receives the path change notification from the storage hypervisor 214 and alters the virtual path control table 310 (S164). Specifically, the channel adaptor number 313 is changed to "1" in the entry with the virtual storage system number 311 of "0", the virtual channel adaptor number 312 of "0", and the channel adaptor number 313 of "0".

Then, the control terminal 300 notifies the storage hypervisor 214 of the completion of the alteration of the virtual path control table 310.

The storage hypervisor 214 receives the alteration completion notification from the control terminal 300 and retransmits uncompleted transmit information to the I/O adaptor that forms the new path (S 165).

Information thus transmitted includes a completion notification about a disk I/O command. There are a plurality of communication protocols for I/O channels. According to the Fibre Channel, which is one of such communication protocols, an I/O adaptor or channel adaptor that has received some information may report the reception (acknowledgement) to the source. The step S165 retransmits information transmitted to the I/O adaptor but for which no acknowledgement has been received.

As described so far, by the fault handling process on the virtual machine, side shown in FIG. 16 and the fault handling process on the virtual storage system side shown in FIG. 17, the virtual path control table 310 is altered and the path between the virtual machine (0) 130 and the virtual storage system (0) 230 is recovered, whereby communication is enabled between the two parties. Because this process of changing a path is performed by the hypervisor 103 and the storage hypervisor 214, the OS (0) 135, the OS (1) 145, the OS (2) 185, and the OS (3) 195 are unable to detect faults. This provides an advantage that there is no need to handle a fault on the OS side.

Figure 18:
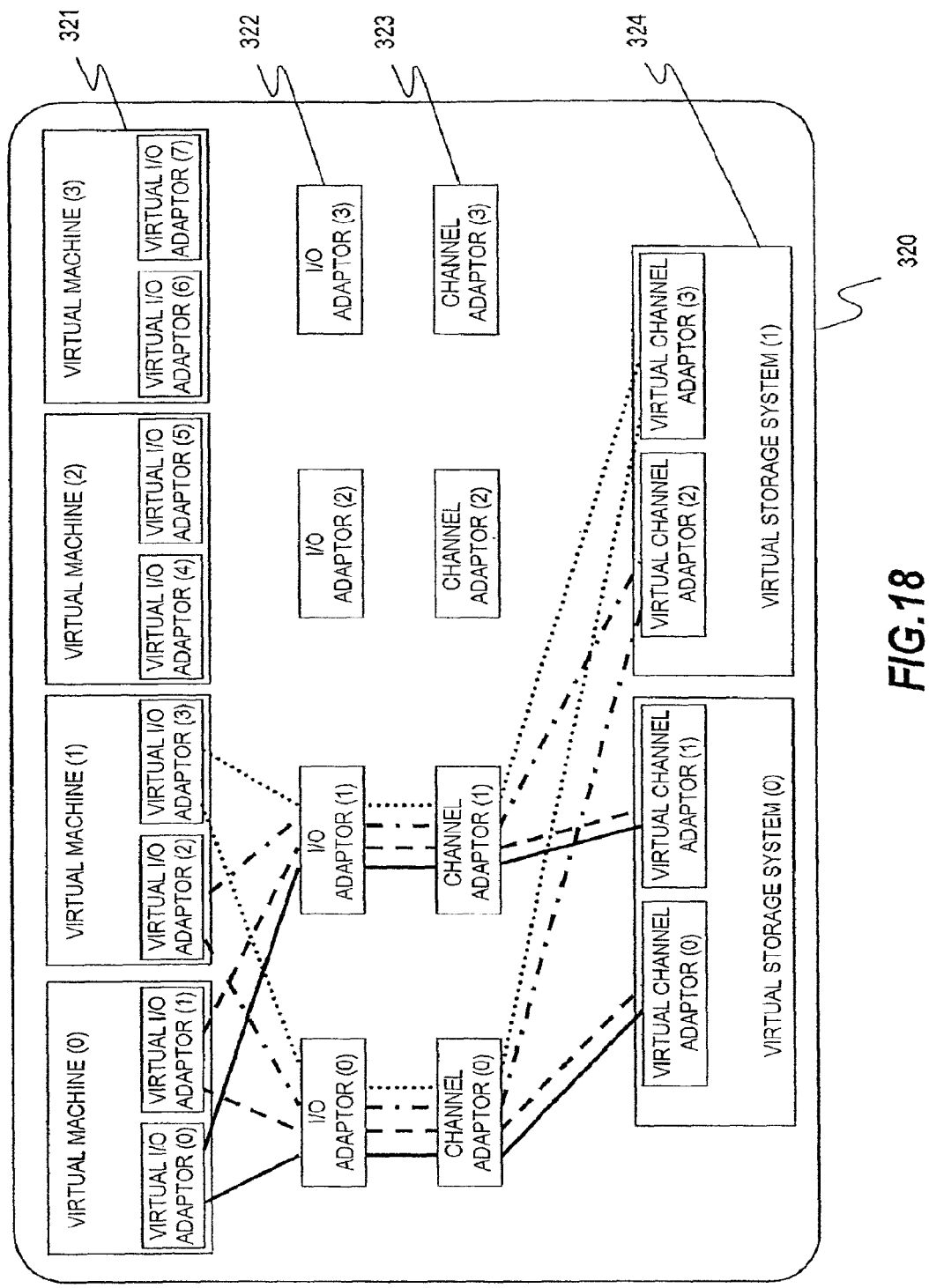
FIG. 18 is a diagram illustrating a screen displayed on a control terminal according to the first embodiment.

FIG. 18 is a diagram illustrating a screen displayed on the control terminal 300 according to the first embodiment.

A monitor screen 320 of the control terminal 300 displays control information required for the administrator to control the computer system. In other words, the monitor screen 320 of the control terminal 300 visually displays the relations among the pieces of information stored in the virtual path control table 310 shown in FIG. 5 (the virtual machine numbers 316, the virtual I/O adaptor numbers 315, the I/O adaptor numbers 314, the channel adaptor numbers 313, the virtual channel adaptor numbers 312, and the virtual storage system numbers 311).

Specifically, the monitor screen 320 includes virtual machine display areas 321, I/O adaptor display areas 322, channel adaptor display areas 323, and storage system display areas 324.

The virtual machine display areas 321 display the virtual machines (0) to (3) of this computer system. The virtual I/O adaptors are displayed in each virtual machine.

The I/O adaptor display areas 322 display the physical I/O adaptors (0) to (3) of the server systems of the computer system.

The channel adaptor display areas 323 display the physical channel adaptors (0) to (3) of the storage system of the computer system.

The storage system display areas 324 display the virtual storage systems (0) and (1) of the computer system. The virtual channel adaptors are displayed in each virtual storage system.

The monitor screen 320 also displays the paths established between the virtual machines (virtual I/O adaptors) and the virtual storage systems (virtual channel adaptors). The monitor screen 320 visually shows which I/O adaptors and which channel adaptors the paths pass through. Furthermore, different paths are indicated by different kinds of lines (or in different colors) so that the routing of the paths can be seen easily.

The monitor screen 320 of the control terminal 300 thus visually displays the routing of paths to show that the paths connecting the virtual machines and the virtual storage systems are physically separated into different paths and thus form a redundant configuration. The administrator can see the correspondence between the physical connections and virtual connections between the virtual machines and the virtual storage systems.

In other words, between the virtual machine (0) and the virtual storage system (0), two paths are routed via different virtual I/O adaptors and different virtual channel adaptors. Physically, too, the two paths pass via different I/O adaptors and different channel adaptors, thus forming a redundant configuration both virtually and physically.

As described so far, in creating a virtual machine according to the first embodiment of this invention, a virtual machine control program sets the configuration of the computer system while confirming correct relations among physical resources (physical paths) and virtual resources (virtual paths) according to a virtual path control table. In other words, in logically partitioning server and storage systems in cooperation, the relations among the physical resources and logical resources can be confirmed. This makes it possible to easily set a high-availability configuration of a computer system using virtual machines.

Second Embodiment

According to a second embodiment of this invention, path control programs run on virtual machines. The path control programs control the paths set up between the virtual machines and the virtual storage systems and also handle faults of the I/O channels.

Figure 19:
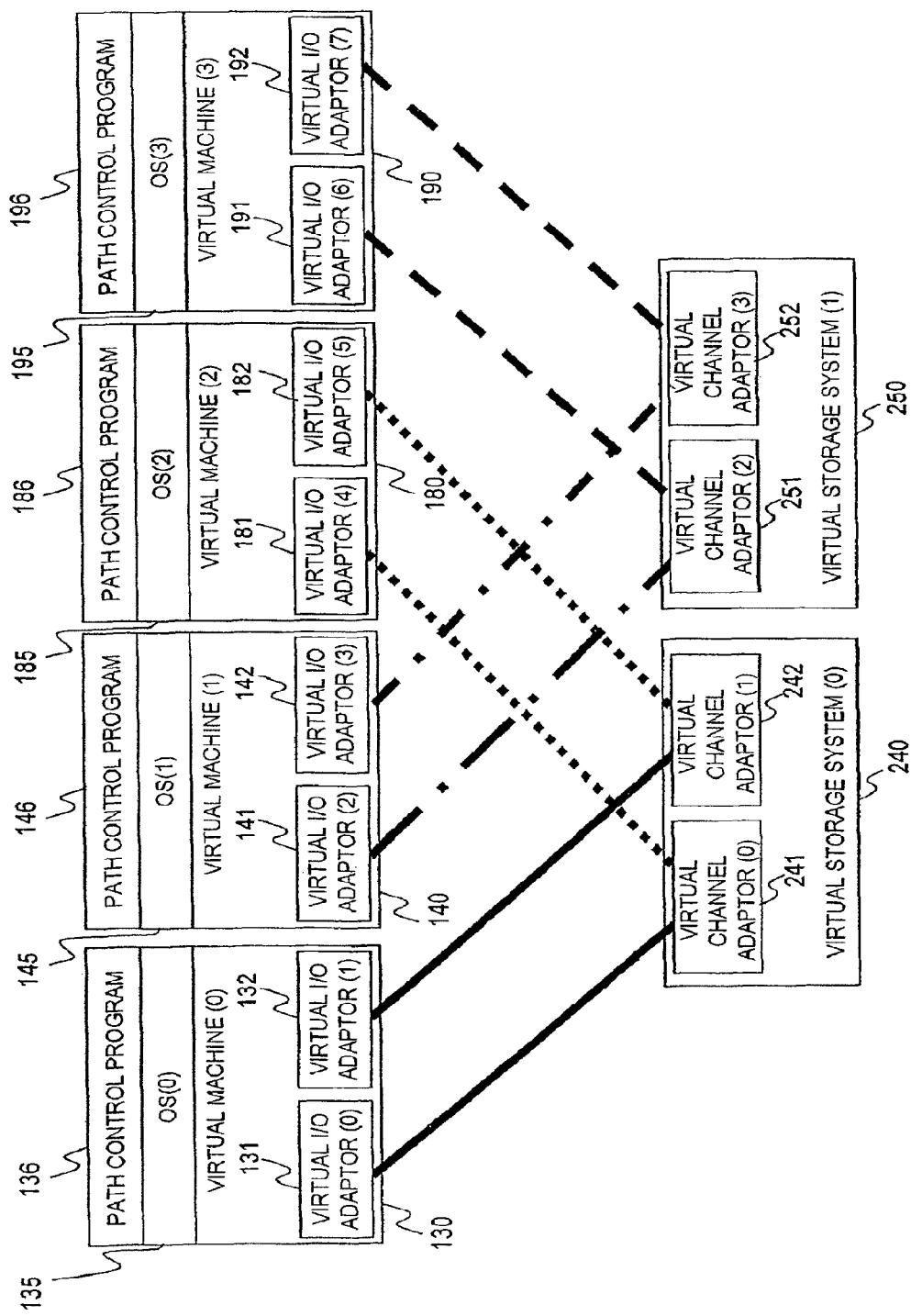
FIG. 19 is a diagram illustrating connections in a computer system according to a second embodiment of this invention.

FIG. 19 is a diagram illustrating connections in a computer system according to the second embodiment. Like FIG. 8, FIG. 19 shows the connections in the computer system in the software perspective (seen from the virtual world). FIG. 19 therefore does not show the hardware configuration of the computer system (e.g., the I/O adaptors 106 etc. and the channel adaptors 231 etc.).

In the virtual machine (0) 130, an OS (0) 135 and a path control program 136 run. The path control program 136 is stored in the storage system 200, and when the virtual machine (0) 130 is booted, the path control program 136 is read from the storage system 200, loaded into a main memory 104, and executed by a CPU 101. Alternatively, the path control program 136 may be stored in a non-volatile memory in the server system and loaded from the non-volatile memory. The path control program 136 manages the paths set up between the virtual I/O adaptors related to the virtual machine (0) 130 and the virtual channel adaptors related to the virtual storage system (0) 240.

Similarly, an OS 145 and a path control program 146 run in a virtual machine 140. An OS 185 and a path control program 186 run in a virtual machine 180. Also, an OS 195 and a path control program 196 run in a virtual machine 190. The path control programs 156, 186, and 196 manage the paths set up for the respective virtual machines.

Like FIG. 8 described earlier, FIG. 19, too, shows the relations among the virtual machine numbers 316, the virtual I/O adaptor numbers 315, the virtual channel adaptor numbers 312, and the virtual storage system numbers 311 in the virtual path control table 310 shown in FIG. 5. The connections between the virtual machines and the virtual storage systems are the same as those shown in FIG. 8 described earlier and therefore not described here again.

Figure 20:
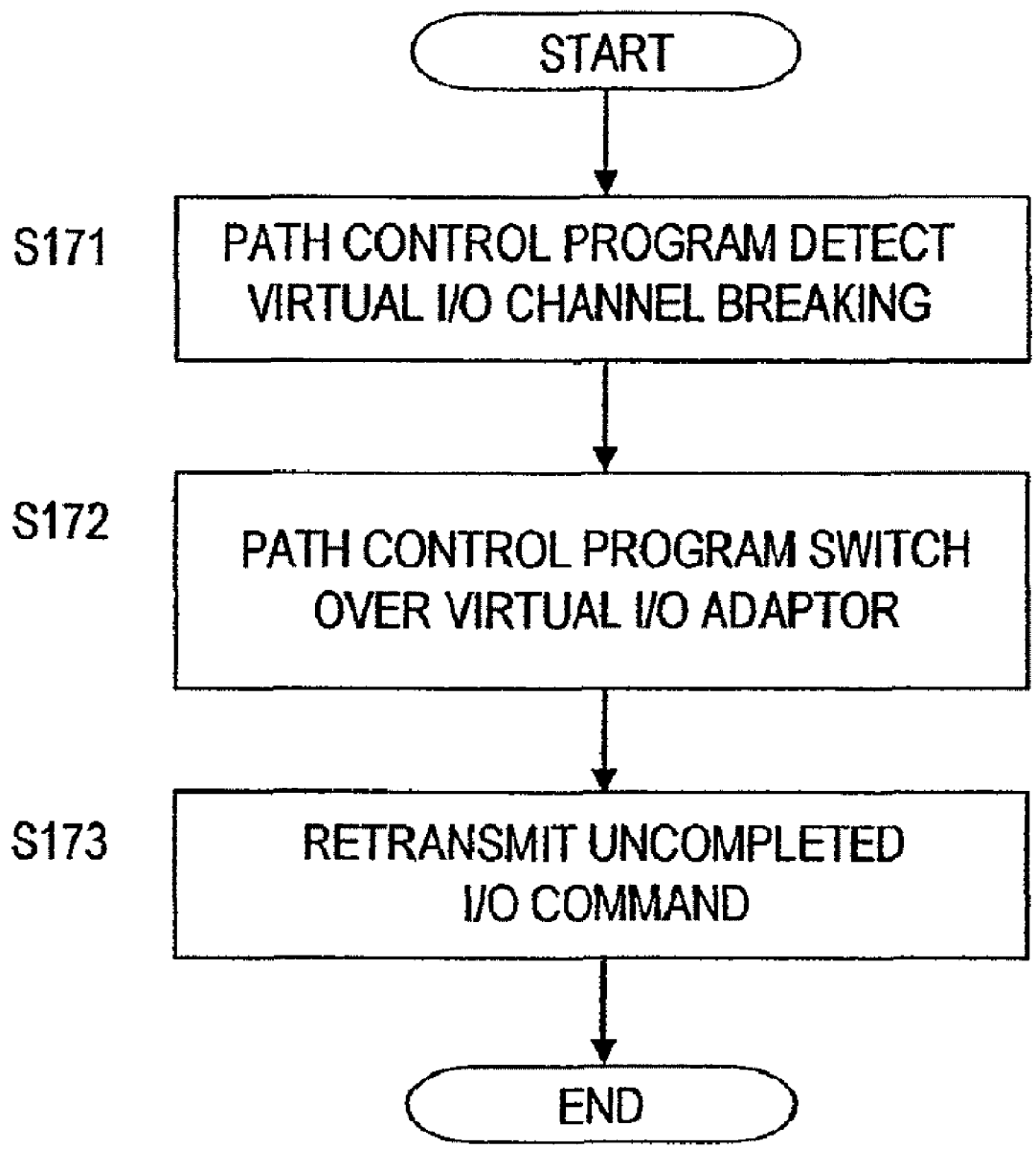
FIG. 20 is a flowchart of a fault handling process according to the second embodiment.

FIG. 20 is a flowchart of a fault handling process according to the second embodiment. While the flowchart shows an example in which the path control program 136 in the virtual machine (0) 130 detects a fault of I/O channels 400, the other path control programs 146, 186, and 196 are also capable of detecting faults in the same way.

First, the path control program 136 detects a breaking of an I/O channel 400 (S171). This fault handling process is not executed when no breaking of I/O channels 400 is detected.

As for the breaking of I/O channels 400, an I/O channel 400 is judged to be broken when, for example, the virtual machine 130 of the server system (0) 100 has issued a disk I/O command but does not receive a disk I/O completion notification before a timeout occurs. A breaking detecting circuit for detecting breaking of I/O channels 400 may be provided in the server system (0) 100 and the path control program 136 may monitor for breaking.

In other words, this fault handling process may be executed at the moment of an occurrence of a disk I/O, or may be executed otherwise.

Next, the path control program 136 switches the virtual I/O adaptor that the virtual machine (0) 130 uses to access the virtual storage system (0) 240 (S172). Specifically, the path control program 136 switches the I/O from the virtual I/O adaptor (0) 131 to the virtual I/O adaptor (1) 132.

Subsequently, the path control program 136 retransmits uncompleted transmit information (e.g., an issued disk I/O command for which completion notification has not been received) to the corresponding I/O adaptor (S 173).

In this way, according to the second embodiment, when an I/O channel fails, the path control program switches over the virtual I/O adaptor that the virtual machine uses. This makes it possible to recover from the fault without altering the virtual path control table 310 of the control terminal 300.

Third Embodiment

According to a third embodiment of this invention, cluster control programs run on virtual machines. The cluster control programs control the cluster configuration with the virtual machines forming a pair.

Figure 21:
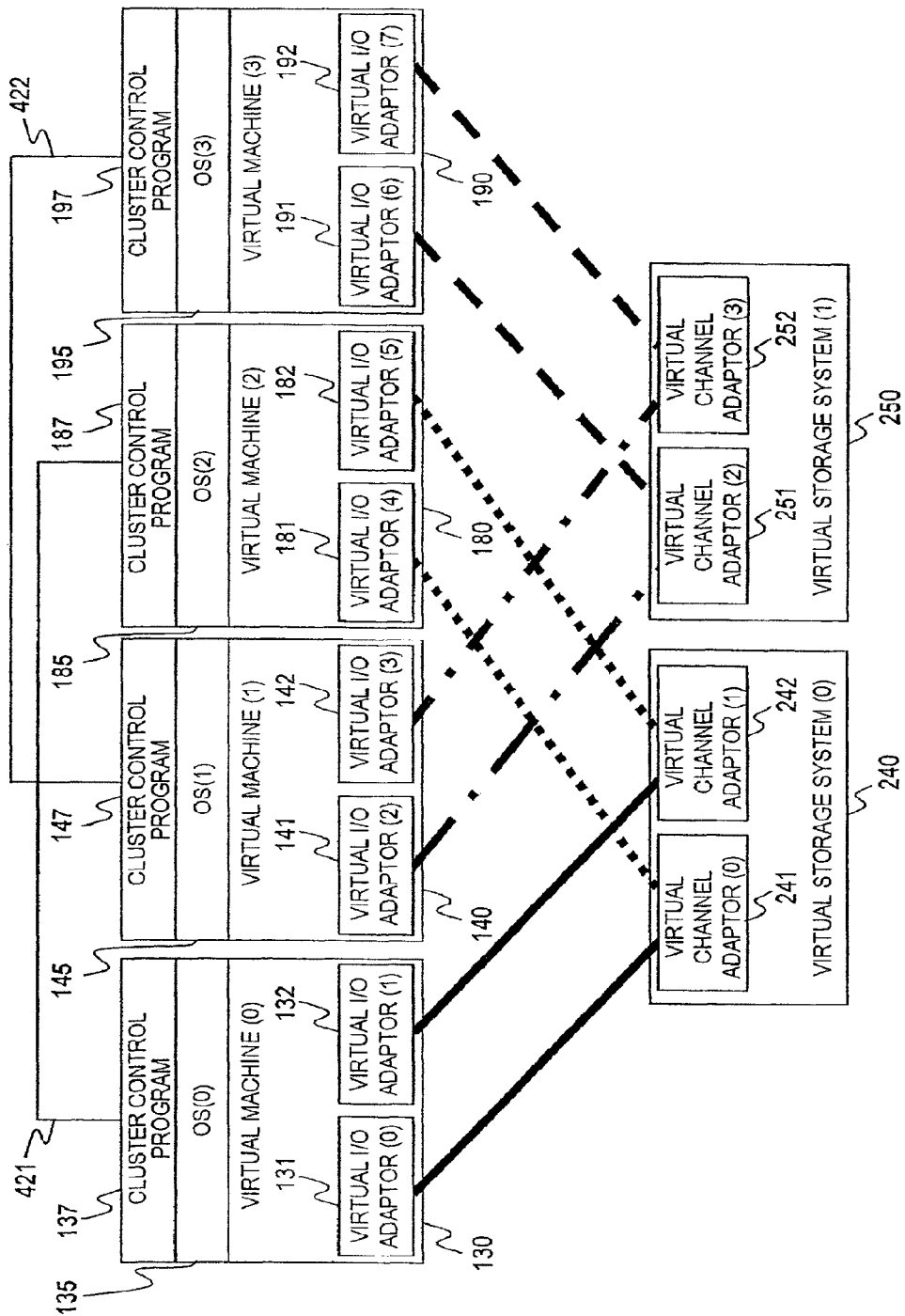
FIG. 21 is a diagram illustrating connections in a computer system according to a third embodiment of this invention.

FIG. 21 is a diagram illustrating connections in a computer system according to the third embodiment. Like FIG. 8, FIG. 21 shows the connections in the computer system in the software perspective (seen from the virtual world). FIG. 21 therefore does not show the hardware configuration of the computer system (e.g., the I/O adaptors 106 etc. and the channel adaptors 231 etc.).

In the virtual machine (2) 180, an OS (2) 185 and a cluster control program 187 run. The cluster control program 187 is stored in the storage system 200, and when the virtual machine (2) 180 is booted, the cluster control program 187 is read from the storage system 200, loaded into a main memory (1) 154, and executed by a CPU 151. Alternatively, the cluster control program 187 may be stored in a non-volatile memory in the server system and loaded from the non-volatile memory.

In this embodiment, the virtual machine (0) 130 and the virtual machine (2) 180 configured on different hardware systems (server systems) form a cluster. The virtual machines forming a cluster pair are connected through a communication path 421. The communication path 421 may be formed of a specialized line connecting the server system (0) 100 and the server system (1) 150. Alternatively, the network 410 may be used.

The virtual machines forming a cluster pair issue a control I/O for fault detection (e.g., a heart beat signal) through the communication path 421 with given timing (e.g., periodically). Then, when one virtual machine does not receive the control I/O issued by the other virtual machine of the cluster pair, that one virtual machine judges that a fault has occurred in the other virtual machine.

The virtual machines forming a cluster pair have virtual I/O adaptors of the same configuration because, in the event of a failover, they have to provide services using the same data stored in the virtual storage system 240 and the like, and the virtual I/O adaptors forming pairs in the cluster are connected to the virtual storage system in the same way.

Similarly, the virtual machine (1) 140 and the virtual machine (3) 190 are connected through a communication path 422 and form a cluster.

Like FIG. 8 described earlier, FIG. 21, too, shows the relations among the virtual machine numbers 316, the virtual I/O adaptor numbers 315, the virtual channel adaptor numbers 312, and the virtual storage system numbers 311 in the virtual path control table 310 shown in FIG. 5. The connections between the virtual machines and the virtual storage systems are the same as those shown in FIG. 8 described earlier and therefore not described again here.

Figure 22:
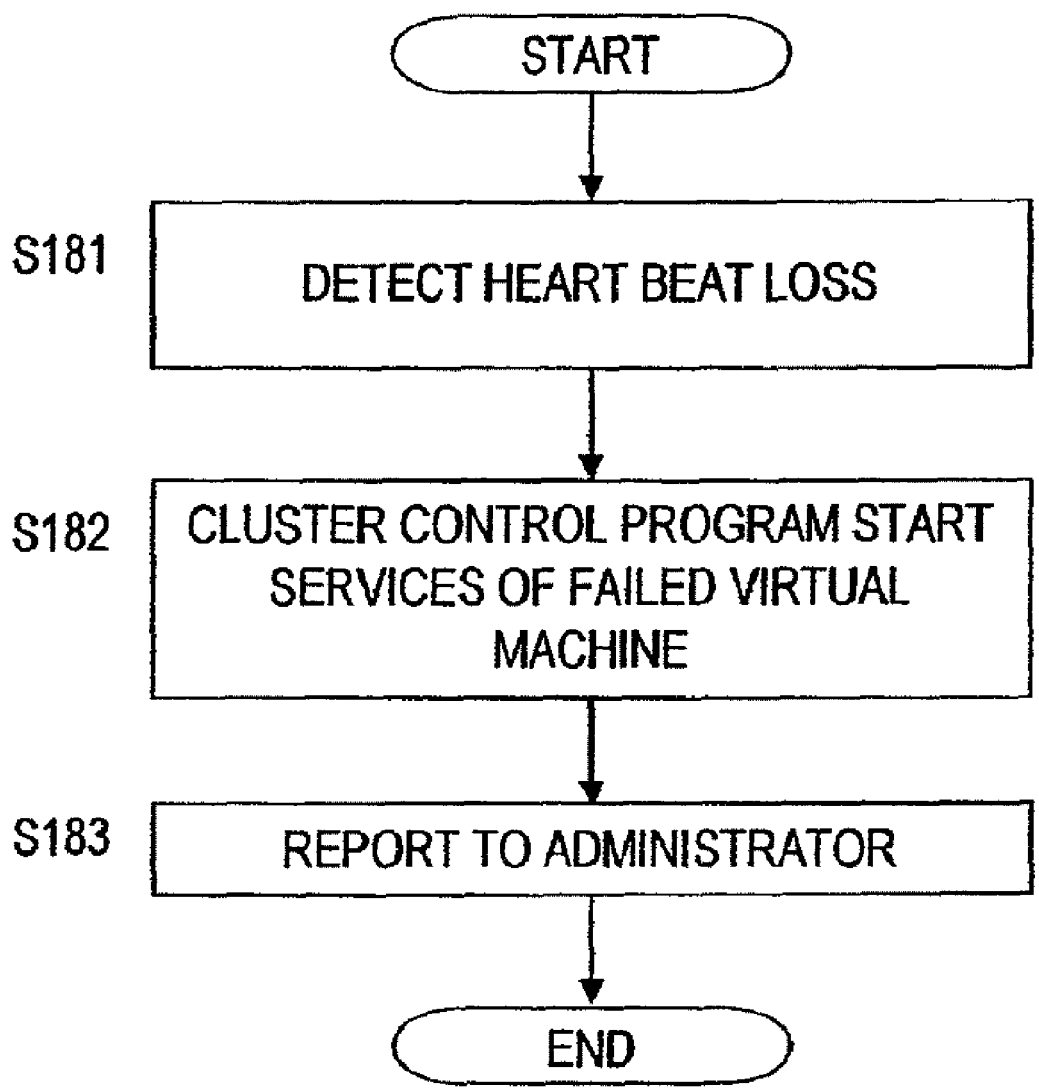
FIG. 22 is a flowchart of a fault handling process according to the third embodiment.

FIG. 22 is a flowchart of a fault handling process according to the third embodiment. The flowchart describes an example in which the hypervisor 103 reboots the virtual machine (0) 130, but other hypervisors and other virtual machines are capable of performing the same rebooting process.

First, when the cluster control program 137 does not receive a heart beat signal from the virtual machine (0) 130 for a predetermined time period, the heart beat is judged to be lost (S 181). This fault handling process is not executed when loss of heart beat signal is not detected.

Specifically, for example, the heart beat signal is judged to, be lost when periodically sent heart beat signals are not received for a predetermined time period for plural times. In other words, it is judged that a fault has occurred in the virtual machine (0) 130.

Next, the cluster control program 187 makes preparations for a failover by loading, in the virtual machine (2) 180, the programs for services that the failed virtual machine (0) 130 had been providing (S182). Then, the virtual machine (0) 130 is separated off from the computer system. Then, access from clients (not shown) to the virtual machine (0) 130 is stopped.

Subsequently, the cluster control program 187 notifies the administrator that a fault has occurred in the virtual machine (0) 130 and that preparation for taking over the work have been completed (S 183).

Then, with an instruction from the administrator, the service is taken over from the virtual machine (0) 130 to the virtual machine (2) 180.

Figure 23:
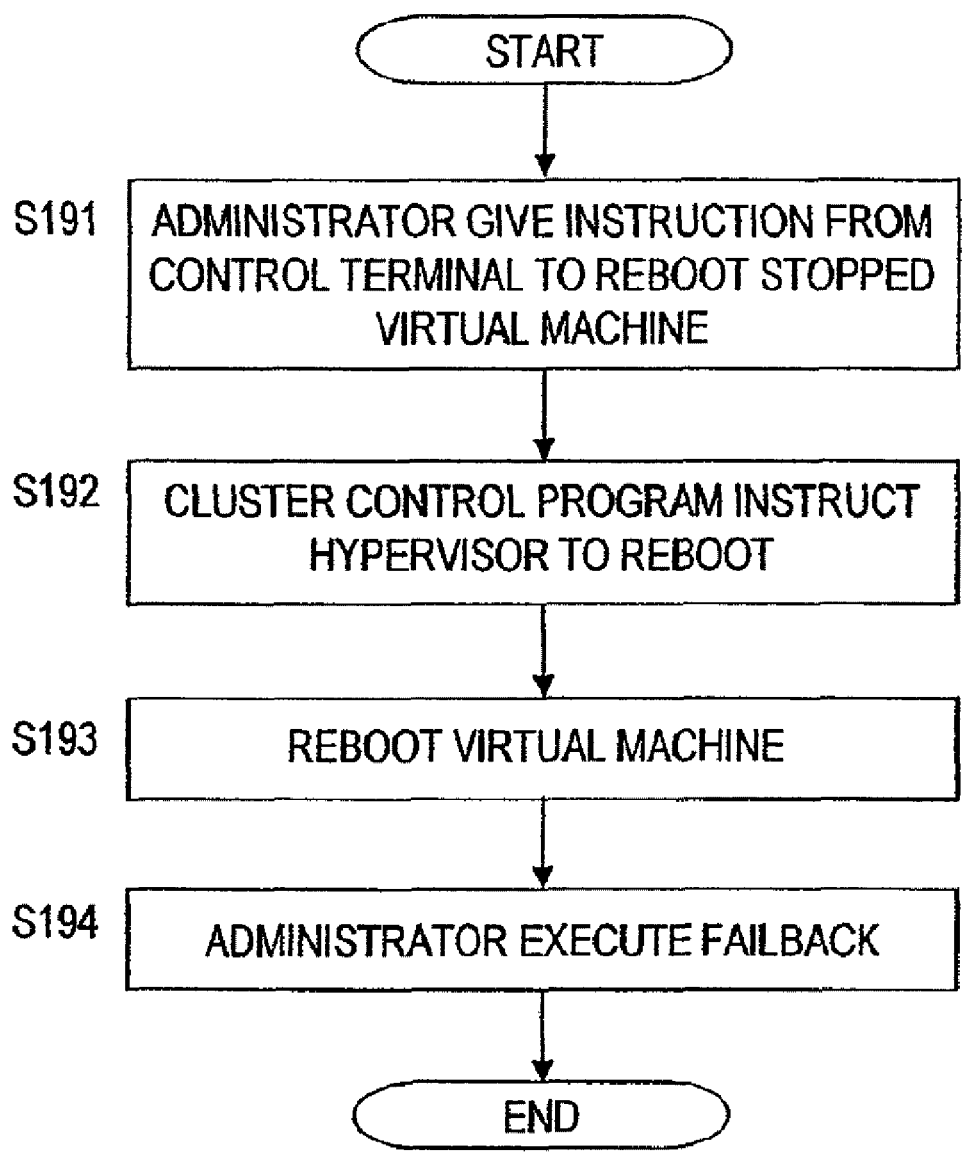
FIG. 23 is a flowchart of a virtual machine rebooting process according to the third embodiment.

FIG. 23 is a flowchart of a process of rebooting a virtual machine according to the third embodiment. The flowchart describes an example in which the hypervisor 103 reboots the virtual machine (0) 130, but other hypervisors and other virtual machines are capable of executing the same rebooting process.

First, the administrator gives an instruction from the control terminal 300 to reboot the stopped virtual machine (0) 130 (S191).

The virtual machine (0) 130 receives the reboot instruction from the control terminal 300 through the network 410 Actually, the hypervisor 103 receives the reboot instruction. (S192).

Subsequently, the hypervisor 103 reboots the virtual machine (0) 130 (S 193).

After that, the administrator gives an instruction for a failback from the control terminal 300 (S 194). With this failback instruction, the work taken over to the virtual machine (2) 180 is restarted in the virtual machine (0) 130. Specifically, the program of services that the rebooted virtual machine had been providing is started in the virtual machine (0) 130. Then, the virtual machine (0) 130 is connected to the computer system. Thus, access to the virtual machine (0) 130 from clients restarts.

Fourth Embodiment

A fourth embodiment of this invention differs from the first embodiment in that the control terminal 300 does not have a virtual path control table but the storage system 200 has a virtual path control table 266.

Figure 24:
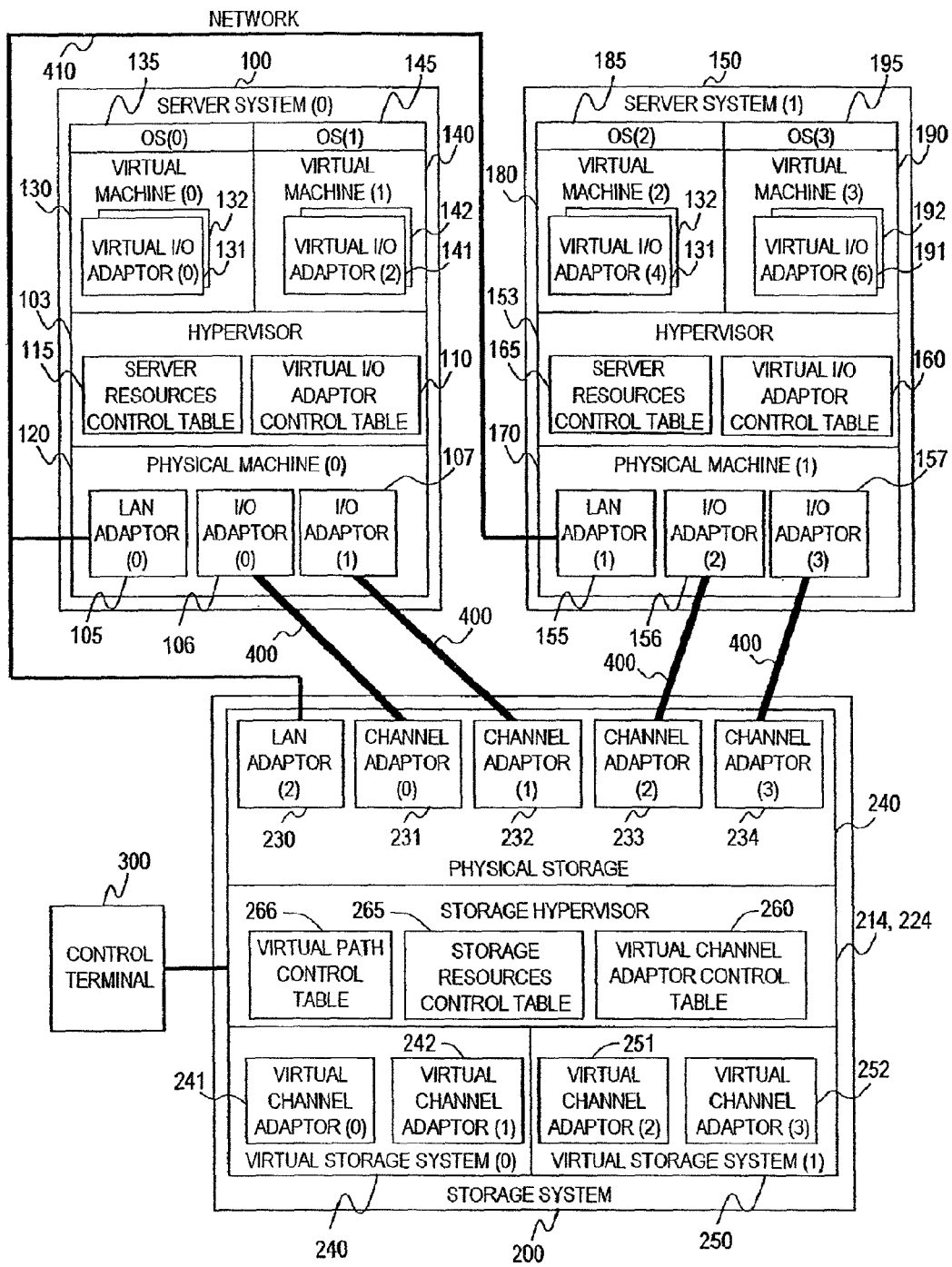
FIG. 24 is a functional block diagram showing a computer system according to a fourth embodiment of this invention.

FIG. 24 is a functional block diagram of a computer system according to the fourth embodiment.

The computer system of the fourth embodiment includes a server system (0) 100, a server system (1) 150, a storage system 200, and a control terminal 300. The same components as those described in the first embodiment are shown at the same reference numerals and not described here again.

Functionally, the server system (0) 100 and the server system (1) 150 can be roughly divided into a physical layer, a hypervisor layer, and a virtual machine layer. The configuration and functions of parts of each layer are the same as those described in the first embodiment.

Also, functionally, the storage system 200 can be roughly divided into a physical layer, a hypervisor layer, and a virtual storage layer. The configuration and functions of parts of each layer are the same as those described in the first embodiment.

The storage system 200 of this embodiment has the virtual path control table 266. The storage hypervisors 214 and 224 control the virtual configuration of the storage system 200 using the virtual path control table 266. In other words, in the fourth embodiment, the storage system 200 having the virtual path control table 266 includes a control unit (not shown) containing connection information that defines connections between the virtual machines and the virtual storage systems (the virtual path control table 266).

The virtual path control table 266 describes the relations between the virtual machines and the virtual storage systems. Specifically, the virtual path control table 266 has the same configuration and contains the same control information as the virtual path control table 310, shown in FIG. 5, of the first embodiment.

The storage hypervisors 214 and 224 generate the virtual path control table 266 by collecting together the control information contained in the virtual I/O adaptor control table 110 of the server system (0) 100, the control information contained in the virtual I/O adaptor control table 160 of the server system (1) 150, and the control information contained in the virtual channel adaptor control table 260 of the storage system 200.

The control terminal 300 is a computer apparatus that manages the computer system and includes a CPU, a memory, an input/output device, and an interface in an integrated fashion. The control terminal 300 is a service processor (SVP). The administrator can manage the computer system by operating the control terminal 300.

The interface of the control terminal 300 is connected to the storage system 200. Alternatively, instead of being connected directly to the storage system 200, the control terminal 300 may be connected to the storage system 200 via the network 410.

While FIG. 24 describes an example in which two server systems 100 and 150 and one storage system 200 are connected, three or more server systems may be provided, and two or more storage systems may be provided. In such a case, the control terminal 300 may be connected to any of the storage systems, but is preferably connected to a storage system that possesses the virtual path control table 266. A plurality of storage systems may possess virtual path control tables 266. The table can thus be duplicated in case of a fault.

Fifth Embodiment

A fifth embodiment of this invention differs from the first embodiment in that the control terminal 300 does not have a virtual path control table but the server system (0) 100 has a virtual path control table 116.

Figure 25:
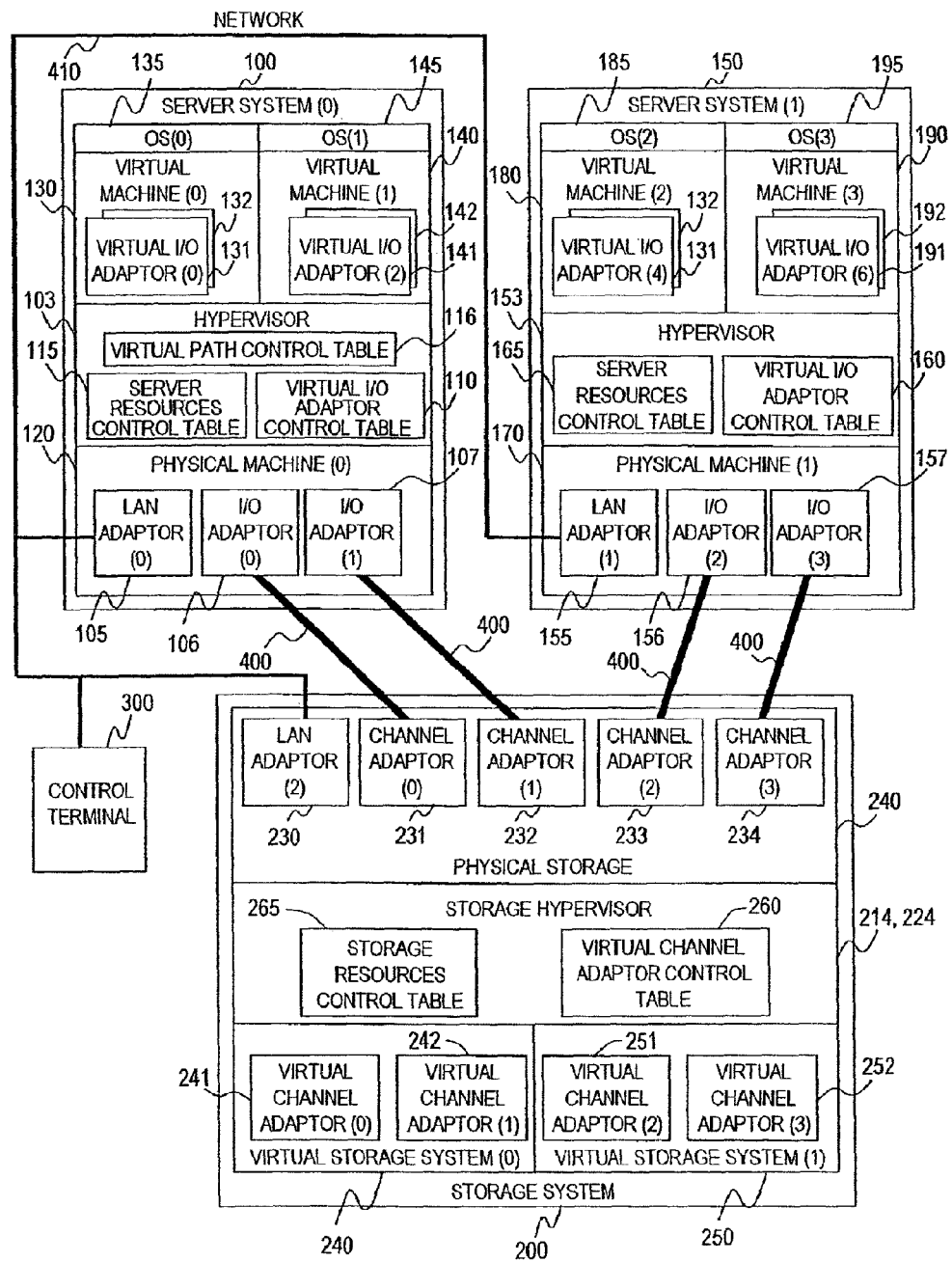
FIG. 25 is a functional block diagram showing a computer system according to a fifth embodiment of this invention.

FIG. 25 is a functional block diagram of a computer system according to the fifth embodiment.

The computer system of the fifth embodiment includes a server system (0) 100, a server system (1) 150, a storage system 200, and a control terminal 300. The same components as those described in the first embodiment are shown at the same reference numerals and not described here again.

Functionally, the server system (0) 100 and the server system (1) 150 can be roughly divided into a physical layer, a hypervisor layer, and a virtual machine layer. The configuration and functions of parts of each layer are the same as those described in the first embodiment.

The server system (0) 100 of this embodiment has the virtual path control table 116. The hypervisor 103 controls the virtual configuration of the computer system using the virtual path control table 116. In other words, in the fifth embodiment, the server system (0) 100 having the virtual path control table 116 includes a control unit (not shown) containing connection information that defines connections between the virtual machines and the virtual storage systems (the virtual path control table 116).

The virtual path control table 116 describes the relations between the virtual machines and the virtual storage systems. Specifically, the virtual path control table 116 has the same configuration and contains the same control information as the virtual path control table 310 shown in FIG. 5 of the first embodiment.

The hypervisor 103 generates the virtual path control table 116 by collecting together the control information contained in the virtual I/O adaptor control table 110 of the server system (0) 100, the control information contained in the virtual I/O adaptor control table 160 of the server system (1) 150, and the control information contained in the virtual channel adaptor control table 260 of the storage system 200.

Functionally, the storage system 200 can be roughly divided into a physical layer, a hypervisor layer, and a virtual storage layer. The configuration and functions of parts of each layer are the same as those described in the first embodiment.

The control terminal 300 is a computer apparatus that manages the computer system and includes a CPU, a memory, an input/output device, and an interface in an integrated fashion.

The control terminal 300 is a service processor (SVP). The administrator can manage the computer system by operating the control terminal 300.

The interface of the control terminal 300 is connected with the server systems 100 and 150 and with the storage system 200 through the network 410. This interface sends and receives control signals and control information (the contents of the various control tables) to and from the systems connected through the network 410. The control terminal 300 may be connected directly to the server system (0) 100.

While FIG. 25 describes an example in which two server systems 100 and 150 and one storage system 200 are connected, three or more server systems may be provided, and two or more storage systems may be provided. In such a case, the control terminal 300 may be connected to any of the server systems, but is preferably connected to a server system that possesses the virtual path control table 116. A plurality of server systems may possess virtual path control tables 116. The table can thus be duplicated in case of a fault.

Sixth Embodiment

A sixth embodiment of this invention differs from the first embodiment described earlier in that the I/O adaptors and the channel adaptors are not directly connected by the I/O channels 400 but are connected via I/O channel switches 401.

Figure 26:
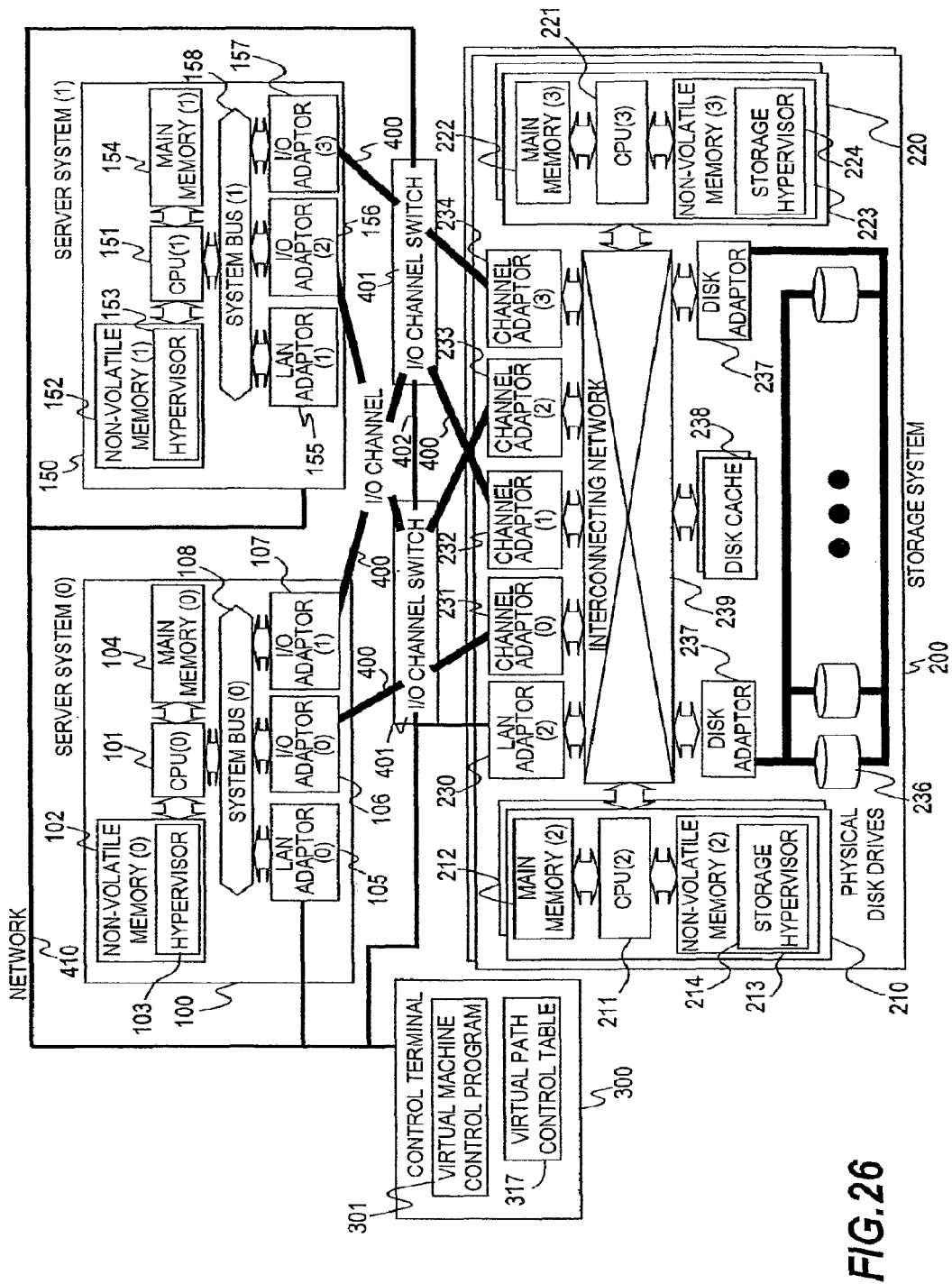
FIG. 26 is a block diagram showing a hardware configuration of a computer system according to a sixth embodiment of this invention.

FIG. 26 is a block diagram showing the hardware configuration of a computer system according to the sixth embodiment.

The computer system according to the sixth embodiment includes a server system (0) 100, a server system (1) 150, a storage system 200, a control terminal 300, and the I/O channel switches 401. The same components as those described in the first embodiment are shown at the same reference numerals and are not described again here.

Application programs run on the server system (0) 100 and the server system (1) 150. The configurations and functions of parts of the server system (0) 100 and the server system (1) 150 are the same as those described in the first embodiment.

An I/O adaptor (0) 106 and an I/O adaptor (1) 107 are connected with the I/O channel switches 401 through the I/O channels 400.

When the I/O adaptor 106 or 107 sends a data input/output request and output data to the storage system 200, the I/O channel switch 401 receives the data input/output request and output data. Then, the I/O channel switch 401 checks the destination of the data input/output request and output data and transfers the data input/output request and output data to the destination storage system 200.

The I/O adaptors 106 and 107 receive data stored in the storage system 200 via the I/O channel switches 401.

In the sixth embodiment, too, two I/O adaptors are provided, but more I/O adaptors may be provided. The two I/O adaptors 106 and 107 operate independently. The processing system is thus duplicated so that access from the server system (0) 100 to the storage system 200 is not stopped even when one I/O adaptor fails.

The storage system 200 stores data required for operations of the server systems 100 and 150. The configuration and functions of parts of the storage system 200 are the same as those described in the first embodiment.

The channel adaptors (0) 231 to (3) 234 are connected with the I/O channel switches 401 through the I/O channels 400. The I/O channel switches 401 are connected also with the server system (0) 100 and the server system (1) 150.

The channel adaptor (0) 231 and the channel adaptor (1) 232 are connected with the server system (0) 100 through the I/O channels 400 and the I/O channel switches 401. The channel adaptors 231 and 232 receive data input/output requests and output data from the server system (0) 100 and send data stored in the storage system 200.

Similarly, the channel adaptor (2) 233 and the channel adaptor (3) 234 are connected with the server system (1) 150 through the I/O channels 400 and the I/O channel switches 401. The channel adaptors 233 and 234 receive data input/output requests and output data from the server system (1) 150 and send data stored in the storage system 200.

The storage system 200 thus has a plurality of channel adaptors. The plurality of channel adaptors 231 to 234 operate independently. The processing system is thus duplicated so that access to the storage system 200 from the server systems 100 and 150 does not stop even when one channel adaptor fails.

The control terminal 300 is a computer apparatus that manage in an integrated fashion. The control terminal 300 has a virtual path control table 317 shown in FIG. 27 of a type different from that described in the first embodiment. This is because the paths pass via the I/O channel switches 401 in the sixth embodiment.

The configuration and functions of the other parts of the control terminal 300 are the same as those described in the first embodiment.

The I/O channels 400 are formed of a communication medium that can make communication according to a protocol suitable for data transfer, e.g., the Fibre Channel protocol.

In the sixth embodiment, the I/O channels 400 connect between the I/O adaptors of the server systems 100 and 150 and the I/O channel switches 401, and between the channel adaptors of the storage system 200 and the I/O channel switches 401.

The I/O channel switches 401 are packet transfer devices having a plurality of ports. For example, when the Fibre Channel protocol is used for the I/O channels 400, SAN switches are used as the I/O channel switches 401.

The I/O channel switches 401 each have ports respectively connected to the I/O channels 400 that connect with the I/O adaptors or the channel adaptors. The I/O channel switches 401 hold routing information. The routing information is a routing table (not shown) used to judge destinations of transferred packets. The I/O channel switches 401 refer to the routing table to judge the destination of a packet inputted to a port and sends the packet from a port connected to the destination I/O adaptor or channel adaptor.

The I/O channel switches 401 have a zone configuration table shown in FIG. 30. The zone configuration table defines whether communication is possible or not between ports of the I/O channel switches 401. The I/O channel switches 401 transfer packets only between ports defined as being capable of making communication. Therefore, packet transfer is implemented only between particular apparatuses. The zone configuration table and the routing table may be formed as a single table.

The I/O channel switches 401 are connected also to the network 410. The I/O channel switches 401 are connected also to each other through an interconnecting line 402. The I/O channel switches 401 exchange the routing information for packet transfer through the interconnecting line 402. The I/O channel switches 401 thus share the routing information.

In the sixth embodiment, two I/O channel switches 401 are provided. The two I/O channel switches 401, too, operate independently. The processing system is thus duplicated so that access from the server system (0) 100 to the storage system 200 is not stopped even when one I/O channel switch fails.

The I/O channel switches 401 are also capable of monitoring mutual operating status using the interconnecting line 402. A method similar to the cluster control programs described in the third embodiment can be adopted for the monitoring of operating conditions and the handling of faults.

The network 410 connects the server system (0) 100, the server system (1) 150, the storage system 200, the control terminal 300, and the I/O channel switches 401. The network 410 is configured so that control signals and control information can be communicated among computers according to, e.g., the TCP/IP protocol, where Ethernet is used, for example.

While FIG. 26 shows an example connecting two server systems 100 and 150 and one storage system 200, three or more server systems may be provided and two or more storage systems may be provided.

FIG. 27 is a diagram illustrating the virtual path control table 317 according to the sixth embodiment.

The virtual path control table 317 contains I/O channel switch port numbers 318 and 319 in addition to the items contained in the virtual path control table 310 described in the first embodiment.

The I/O channel port numbers (storage side) 318 are port numbers of the I/O channel switches 401 that are connected to the channel adaptors 231 to 234.

The I/O channel port numbers (server side) 319 are port numbers of the I/O channel switches 401 that are connected to the I/O adaptors 106 to 157.

In the sixth embodiment, managing the virtual paths requires additionally managing the port numbers of the I/O channel switches 401 because the I/O adaptors 106 to 157 and the channel adaptors 231 to 234 are connected only with the I/O channel switches 401.

Figure 28:
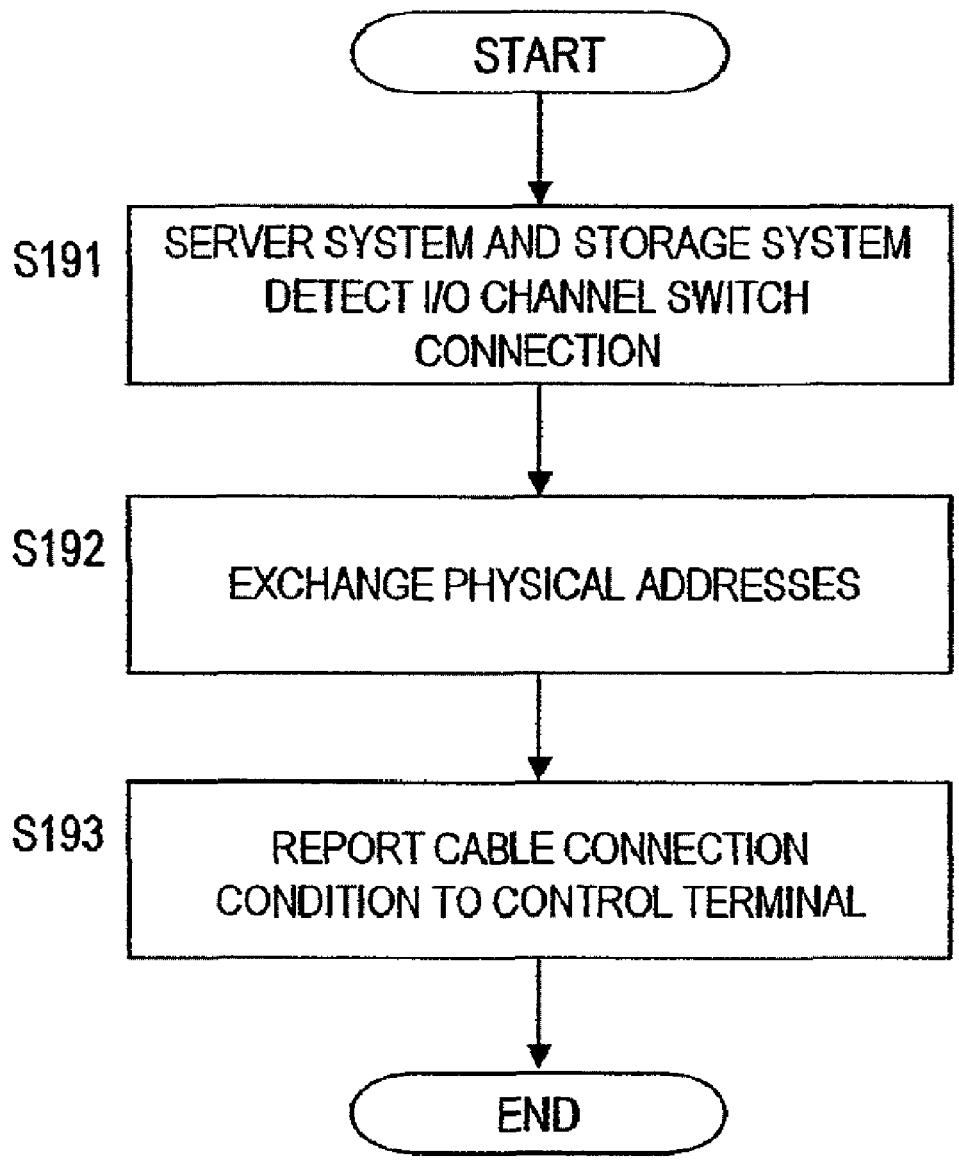
FIG. 28 is a flowchart of a cable connection process in the computer system according to the sixth embodiment.

FIG. 28 is a flowchart of a cable connection process in the computer system according to the sixth embodiment. This cable connection process is performed in the server system (0) 100. The same process is performed also in the server system (1) 150 and the storage system 200.

First, an I/O adaptor of the server system (0) 100 (a channel adaptor of the storage system 200) detects that a connection has been made with an I/O channel switch 401 (S191).

Next, the server system (0) 100 exchanges physical addresses with the I/O channel switch 401 (S192). The addresses exchanged in the step S192 are configured so that the ports of the I/O channel switches 401 can be identified.

The physical addresses exchanged in the step S192 can be any addresses that uniquely identify the ports of the connected I/O channel switch 401. For example, World Wide Names (WWNs) according to the Fibre Channel protocol or MAC addresses according to the iSCSI protocol are exchanged.

Next, the hypervisor 103 notifies the control terminal 300 of the obtained cable connection status (the physical address of the I/O adaptor and the physical address of the I/O channel switch) through the network 410 (S193).

Then, the control terminal 300 registers the correspondence between the I/O adaptor and the I/O channel switch 401 in the virtual path control table 317. Specifically, from the obtained physical addresses, the control terminal 300 registers identifiers of the ports and adaptors in the channel adaptor number 313, the I/O adaptor number 314, the I/O channel port number (storage side) 318, and the I/O channel port number (server side) 319.

Figure 29:
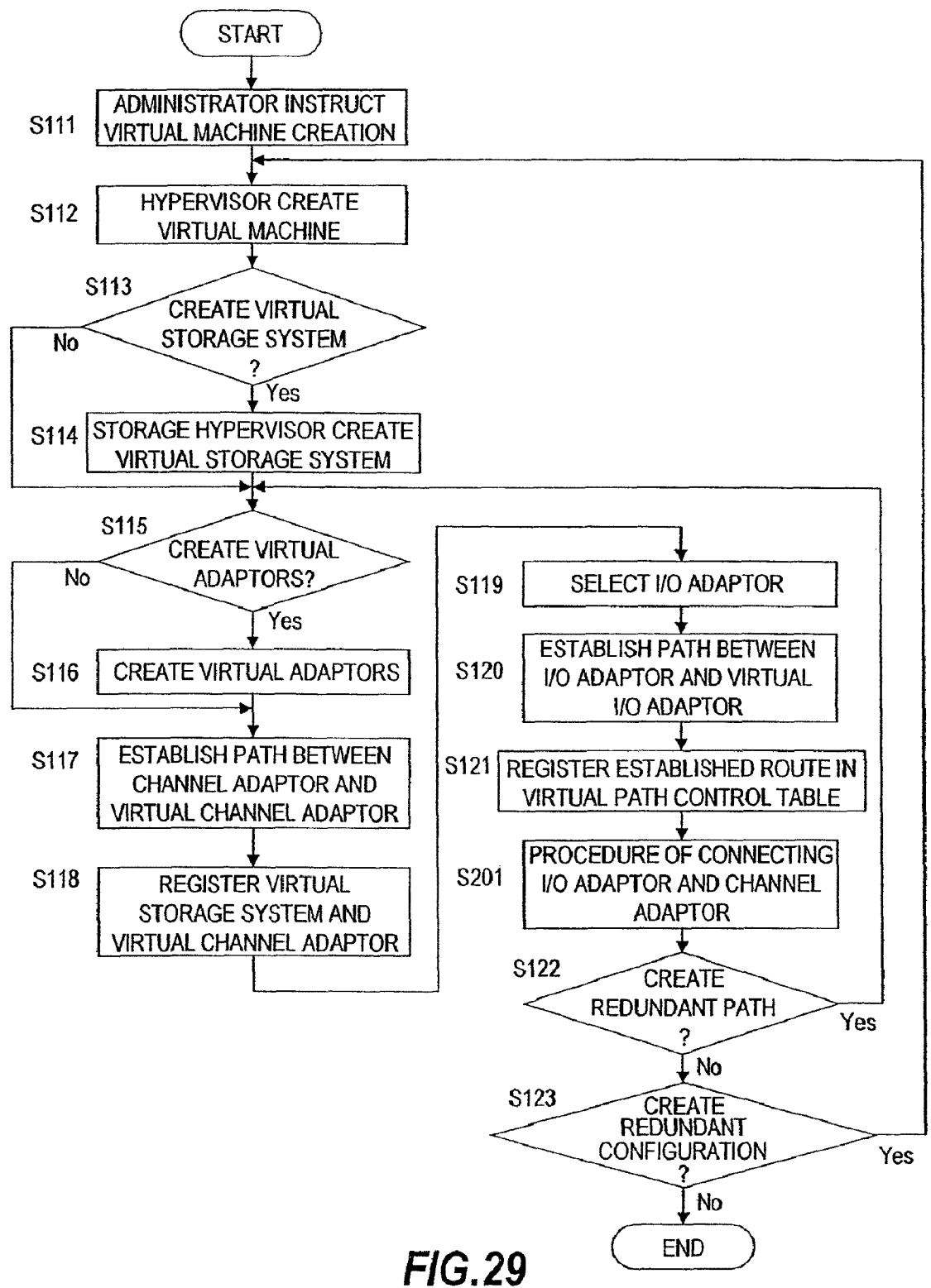
FIG. 29 is a flowchart of a virtual machine creation process in the computer system according to the sixth embodiment.

FIG. 29 is a flowchart of a process of creating a virtual machine in the computer system according to the sixth embodiment.

In the virtual machine creation process of the sixth embodiment, the process steps from the virtual machine creation instruction (S111) to the path creation between the I/O adaptor and the virtual I/O adaptor (S121) are the same as the corresponding process steps of the virtual machine creation process of the first embodiment shown in FIG. 10.

After the control terminal 300 has registered the virtual I/O adaptor number 315 and the virtual machine number 316 in the virtual path control table 317 (S121), a procedure of connecting the I/O adaptor and the channel adaptor is performed (S201).

Specifically, the channel adaptor and the I/O adaptor that are capable of communication are identified by referring to the channel adaptor number 313 and the I/O adaptor number 314 in the virtual path control table 317. Then, a port corresponding to the channel adaptor and a port corresponding to the I/O adaptor are specified, and whether communication between the ports is possible is checked. The result of the judgment is set in the zone configuration table shown in FIG. 30 of the I/O channel switch 401. With this zoning process, the I/O channel switch 401 transfers packets only between particular ports (between particular apparatuses).

Then, whether a redundant path should be created is checked (S122). Then, whether a redundant configuration should be created is checked (S123). These process steps S122 and S123 are the same as those of the virtual machine creation process of the first embodiment shown in FIG. 10.

FIG. 30 is a diagram showing a configuration of the zone configuration table 1300 according to the sixth embodiment.

The zone configuration table 1300 contains input port numbers 1301, output port numbers 1302, and information as to whether communication is possible between the ports.

For example, a packet inputted to the input port (0) can be outputted from the output port (1) but cannot be outputted from the output port (n). Therefore, a packet can be transferred from a system connected to the input port (0) to a system connected to the output port (1), but a packet cannot be transferred from a system connected to the input port (0) to a system connected to the output port (n).

In other words, when the destination of a packet inputted to the input port (0) is a system connected to the output port (n), the packet cannot be transferred to that system.

Also in the sixth embodiment, the virtual path control table 317 may be possessed by the server systems 100 and 150, or by the storage system 200. Also, the I/O channel switches 401 may possess the virtual path control table 317. When the I/O channel switches 401, connected to all of the server systems 100 and 150 and the storage system 200, possess the virtual path control table 317 to control the computer system, then it is not necessary to provide the control terminal 300 in the computer system.

Thus, the hypervisor 103, the hypervisor 153, the storage hypervisor 214, the storage hypervisor 224, and the I/O channel switches 401 cooperate with one another to implement an I/O channel redundant configuration. Also, with the zoning, the security between the virtual machines and between the virtual storage systems is ensured also in the I/O channels.

The description so far has mentioned that a plurality of server systems and a plurality of storage systems may be provided. The embodiments of this invention have shown examples in which one server system is logically partitioned into a plurality of virtual machines, but, needless to say, this invention does not depend on how virtual machines are implemented.

Figure 31:
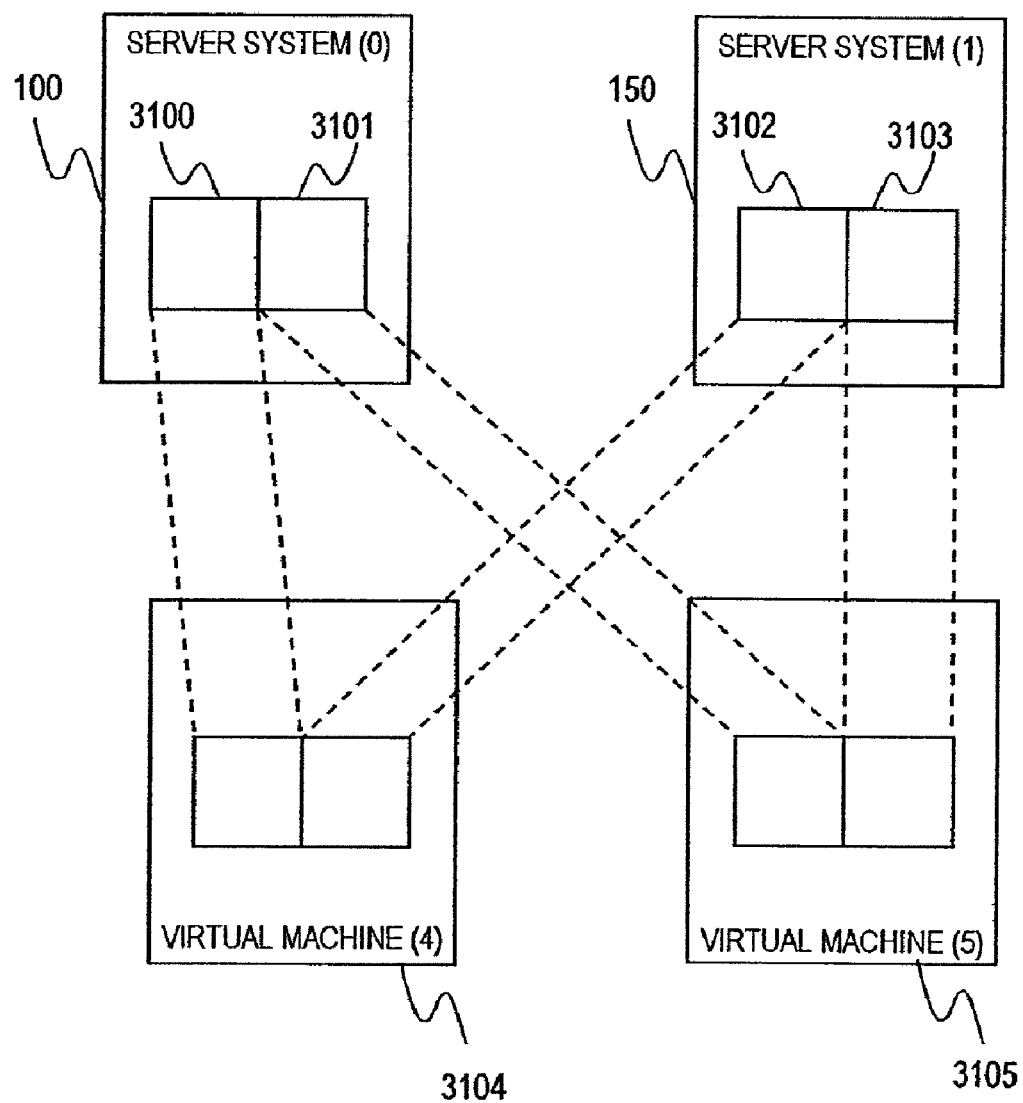
FIG. 31 is a diagram showing another configuration of implementation of virtual machines according to the embodiments.

For example, this invention is applicable also to implementation of virtual machines as shown in FIG. 31. A server system (0) 100 has server resources 3100 and 3101. Similarly, a server system (1) 150 has server resources 3102 and 3103. Each of the server resources 3100, 3101, 3102, and 3103 includes a CPU, a memory, etc.

Then, the resource 3100 of the server system (0) and the resource 3102 of the server system (1) may be extracted to create a virtual machine (4) 3104. Similarly, the resource 3101 of the server system (0) and the resource 3103 of the server system (1) may be extracted to create a virtual machine (5) 3105.

In a similar way, one virtual storage system can be configured by extracting resources of a plurality of storage systems.

This invention is applicable also to such virtual machine and virtual storage system configurations.

While the present invention has been described in detail and pictorially in the accompanying drawings, the present invention is not limited to such detail but covers various obvious modifications and equivalent arrangements, which fall within the purview of the appended claims.

What is claimed is:

1. A management server coupled to a server system which includes a plurality of I/O adapters and manages a virtual machine having a first virtual I/O adapter corresponding to a first I/O adapter in said I/O adapters, and a storage system which includes a plurality of channel adapters and a plurality of disk drives and manages a virtual storage system having a logical unit and a first virtual channel adapter corresponding to a first channel adapter in said channel adapters, said management server comprising:
- a processor which collects from said server system server control information indicating a relationship between said first virtual I/O adapter and said first I/O adapter and storage control information indicating relationship between said first virtual channel adapter and said first channel adapter from said storage system;
- a memory which stores virtual path management information indicating a first path between said virtual machine and said virtual storage system, said first path including a relationship among said first virtual I/O adapter, said first I/O adapter, said first virtual channel adapter, and said first channel adapter; and
- an output device which displays said first path using at least said virtual path management information.

2. A management server according to claim 1, wherein said processor generates said virtual path management information using said server control information and said storage control information.

3. A management server according to claim 1,
wherein, when a failure occurs in said first I/O adapter, then said processor receives a path change notification from said server system, said path change notification indicating that said relationship between said first virtual I/O adapter and said first I/O adapter is changed to a relationship between said first virtual I/O adapter and a second I/O adapter in said I/O adapters,
wherein said processor changes said virtual path management information so that said first path includes a relationship among said first virtual I/O adapter, said second I/O adapter, said first virtual channel adapter, and said first channel adapter.

4. A management server according to claim 1,
wherein, when a failure occurs in said first channel adapter, then said processor receives a path change notification from said storage system, said path change notification indicating that said relationship between said first virtual channel adapter and said first channel adapter is changed to a relationship between said first virtual channel adapter and a second channel adapter in said channel adapters,
wherein said processor changes said virtual path management information so that said first path includes a relationship among said first virtual I/O adapter, said first I/O adapter, said first virtual channel adapter, and said second channel adapter.

5. A management server according to claim 1, wherein said memory further stores storage resource management information which indicates that said logical unit corresponding to at least one of said disk drives is allocated to said virtual storage system.

6. A management server according to claim 1,
wherein said virtual machine further has a second virtual I/O adapter corresponding to a second I/O adapter in said I/O adapters, and said virtual storage system further has a second virtual channel adapter corresponding to a second channel adapter in said channel adapters,
said virtual path management information further indicating a second path between said virtual machine and said virtual storage system, said second path including a relationship among said second virtual I/O adapter, said second I/O adapter, said second virtual channel adapter, and said second channel adapter,
wherein said output device displays said second path along with said first path using said virtual path management information.

7. A method for a management server computer coupled to a server system and to a storage system, the server system including a plurality of I/O adapters and providing a virtual machine having a first virtual I/O adapter corresponding to a first I/O adapter from among said I/O adapters, the storage system including a plurality of channel adapters and a plurality of disk drives and providing a virtual storage system having a logical unit and a first virtual channel adapter corresponding to a first channel adapter from among said channel adapters, the method comprising:
- said management server computer collecting from said server system server control information indicating a relationship between said first virtual I/O adapter and said first I/O adapter and storage control information indicating relationship between said first virtual channel adapter and said first channel adapter from said storage system;
- said management server computer storing in a memory thereof virtual path management information indicating a first path between said virtual machine and said virtual storage system, said first path including a relationship among said first virtual I/O adapter, said first I/O adapter, said first virtual channel adapter, and said first channel adapter; and
- said management server computer displaying on a display device said first path using at least said virtual path management information.

8. The method of claim 7 further comprising said management server computer generating said virtual path management information using said server control information and said storage control information.

9. The method of claim 7 further comprising:
- said management server computer receiving a path change notification from said server system, said path change notification indicating that said relationship between said first virtual I/O adapter and said first I/O adapter is changed to a relationship between said first virtual I/O adapter and a second I/O adapter in said I/O adapters, when a failure occurs in said first I/O adapter; and
- said management server computer changing said virtual path management information so that said first path includes a relationship among said first virtual I/O adapter, said second I/O adapter, said first virtual channel adapter, and said first channel adapter.

10. The method of claim 7 further comprising:
- said management server computer receiving a path change notification from said storage system, said path change notification indicating that said relationship between said first virtual channel adapter and said first channel adapter is changed to a relationship between said first virtual channel adapter and a second channel adapter in said channel adapters, when a failure occurs in said first channel adapter; and
- said management server computer changing said virtual path management information so that said first path includes a relationship among said first virtual I/O adapter, said first I/O adapter, said first virtual channel adapter, and said second channel adapter.

11. The method of claim 7 further comprising said management server computer storing storage resource management information which indicates that said logical unit corresponding to at least one of said disk drives is allocated to said virtual storage system.

12. The method of claim 7,
wherein said virtual machine further has a second virtual I/O adapter corresponding to a second I/O adapter in said I/O adapters, and said virtual storage system further has a second virtual channel adapter corresponding to a second channel adapter in said channel adapters,
said virtual path management information further indicating a second path between said virtual machine and said virtual storage system, said second path including a relationship among said second virtual I/O adapter, said second I/O adapter, said second virtual channel adapter, and said second channel adapter,
the method further comprising said management server computer displaying on said display device said second path along with said first path using said virtual path management information.

* * * * *